US009780997B2

(12) United States Patent
Grinshpun et al.

(10) Patent No.: US 9,780,997 B2
(45) Date of Patent: Oct. 3, 2017

(54) METHOD AND SYSTEM FOR CONTROLLING AN OPERATION OF AN APPLICATION BY CLASSIFYING AN APPLICATION TYPE USING DATA BEARER CHARACTERISTICS

(71) Applicants: Edward Grinshpun, Murray Hill, NJ (US); Qi Liao, Stuttgart (DE); David Faucher, Murray Hill, NJ (US); Zulfiquar Sayeed, Highstown, NJ (US); Sameer Sharma, Murray Hill, NJ (US)

(72) Inventors: Edward Grinshpun, Murray Hill, NJ (US); Qi Liao, Stuttgart (DE); David Faucher, Murray Hill, NJ (US); Zulfiquar Sayeed, Highstown, NJ (US); Sameer Sharma, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 161 days.

(21) Appl. No.: 14/610,598

(22) Filed: Jan. 30, 2015

(65) Prior Publication Data

US 2016/0226703 A1 Aug. 4, 2016

(51) Int. Cl.
*H04W 72/04* (2009.01)
*H04L 12/24* (2006.01)
(Continued)

(52) U.S. Cl.
CPC ...... *H04L 41/0803* (2013.01); *H04L 47/2441* (2013.01); *H04L 47/2475* (2013.01);
(Continued)

(58) Field of Classification Search
CPC ............. H04L 41/0803; H04L 47/2475; H04L 47/2441; H04W 76/021; H04W 24/10; H04W 24/08
See application file for complete search history.

(56) References Cited

U.S. PATENT DOCUMENTS

2003/0126233 A1* 7/2003 Bryers ............... H04L 29/06
709/219
2006/0056447 A1 3/2006 Farnsworth et al.
(Continued)

OTHER PUBLICATIONS

"3rd Generation Partnership Project; Technical Specification Group Services and System Aspects; Policy and Charging Control Architecture (Release 13)," *3GPP TS 23.203*.
(Continued)

*Primary Examiner* — Jay P Patel
(74) *Attorney, Agent, or Firm* — Harness, Dickey & Pierce, P.L.C.

(57) ABSTRACT

An application type of a bearer is classified by computing statistics vectors of bearer metrics and locating points on a label map corresponding to the statistics vectors to obtain application type information. The application type information is exported to a network node to control an operation of application. The bearer metrics include bearer identifier information and bearer condition information, where the bearer condition information includes channel condition information and cell congestion level information. The bearers are paired, such that uplink and downlink bearers for a same application are identified, so that paired bearers are classified together. The label map is produced using previously classified bearer information to calculate cluster centroids and cluster regions that define portions of the map for particular application types. The bearer is classified by determining which cluster region is closest to points on the label map that are associated with the statistics vectors for a particular bearer.

18 Claims, 14 Drawing Sheets

(51) Int. Cl.
*H04W 24/08* (2009.01)
*H04L 12/859* (2013.01)
*H04L 12/851* (2013.01)
*H04W 24/10* (2009.01)
*H04W 76/02* (2009.01)

(52) U.S. Cl.
CPC ........... *H04W 24/08* (2013.01); *H04W 24/10* (2013.01); *H04W 76/021* (2013.01)

(56) References Cited

U.S. PATENT DOCUMENTS

| | | |
|---|---|---|
| 2009/0052330 A1 | 2/2009 | Matsunaga et al. |
| 2009/0271356 A1 | 10/2009 | Jeong et al. |
| 2012/0014282 A1 | 1/2012 | Pappu et al. |
| 2013/0298170 A1 | 11/2013 | ElArabawy et al. |
| 2014/0341109 A1* | 11/2014 | Cartmell ............... H04L 45/308 370/328 |
| 2014/0359626 A1 | 12/2014 | Guedalia et al. |
| 2015/0334737 A1 | 11/2015 | Susitaival et al. |
| 2016/0050653 A1 | 2/2016 | Rastogi |
| 2016/0095126 A1 | 3/2016 | Sridhar et al. |
| 2016/0174219 A1* | 6/2016 | Patil ..................... H04L 5/0055 370/329 |
| 2016/0234715 A1 | 8/2016 | Futaki et al. |

OTHER PUBLICATIONS

"3rd Generation Partnership Project; Technical Specification Group Radio Access Network; Evolved Universal Terrestrial Radio Access (E-UTRA); Physical Layer Procedures (Rlease 12)," *3GPP TS 36.213*, Tables 7.1.7.1-1 and 7.1.7.2.1-1, pp. 46-52.

International Search Report and Written Opinion of the International Searching Authority dated May 10, 2016 in related International Application No. PCT/IB2016/000292.

* cited by examiner

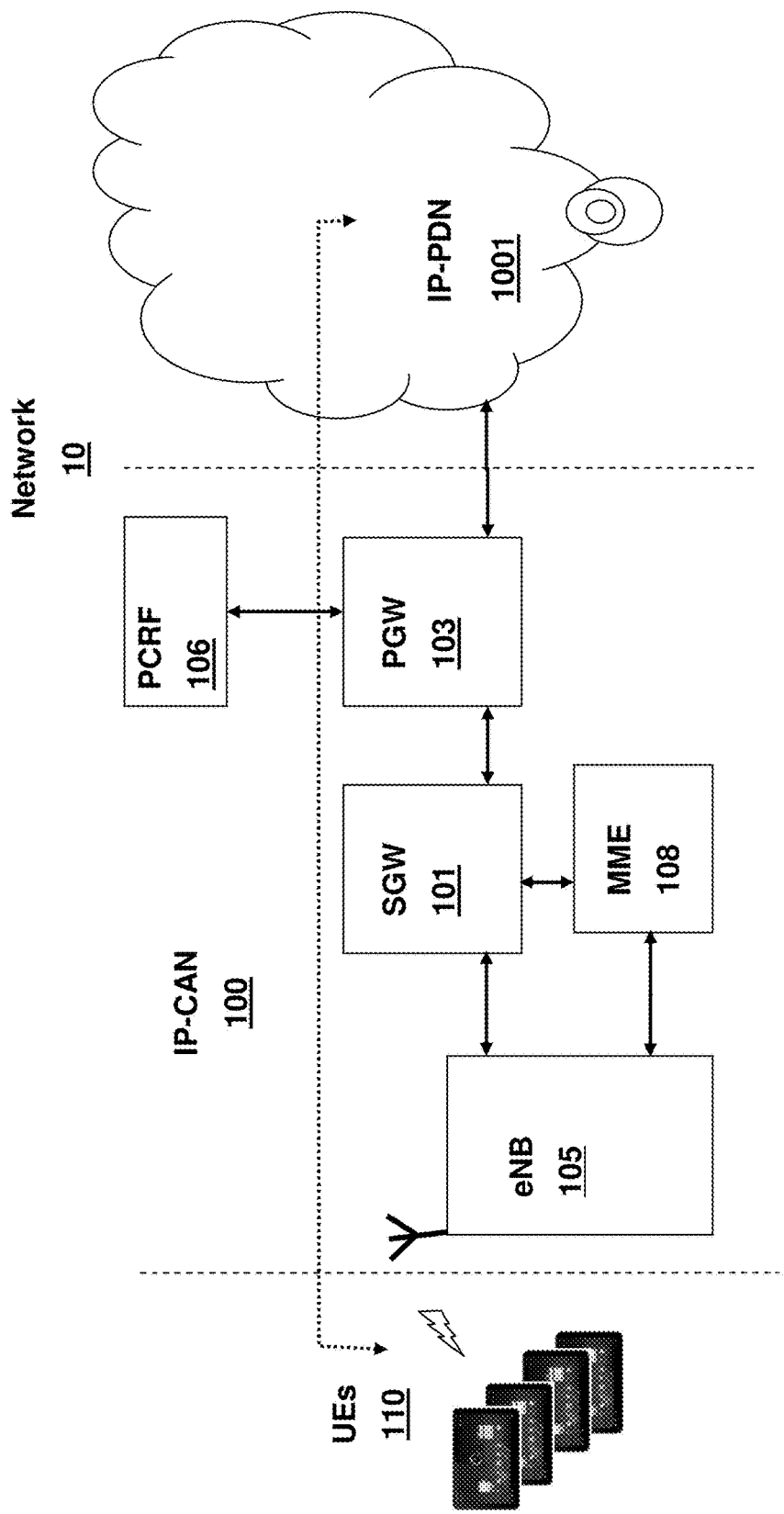
FIG. 1. (CONVENTIONAL)

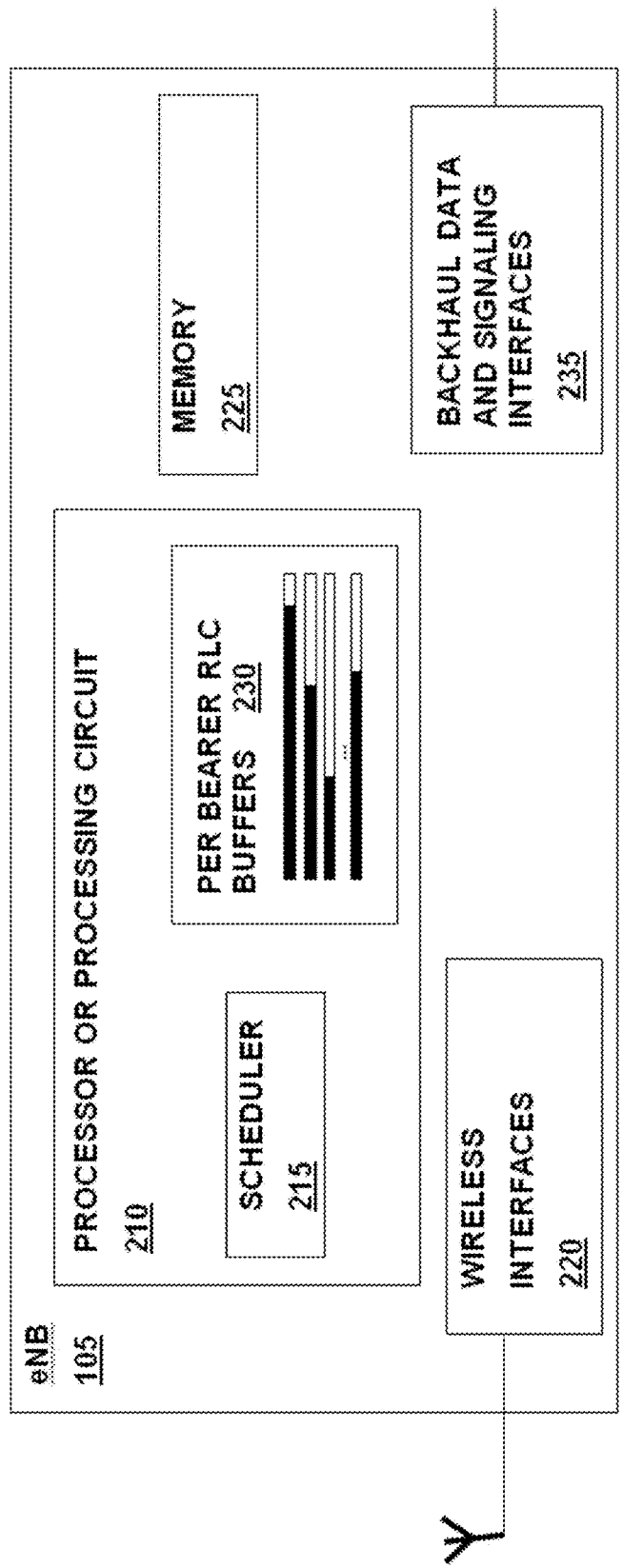
FIG. 2 (CONVENTIONAL)

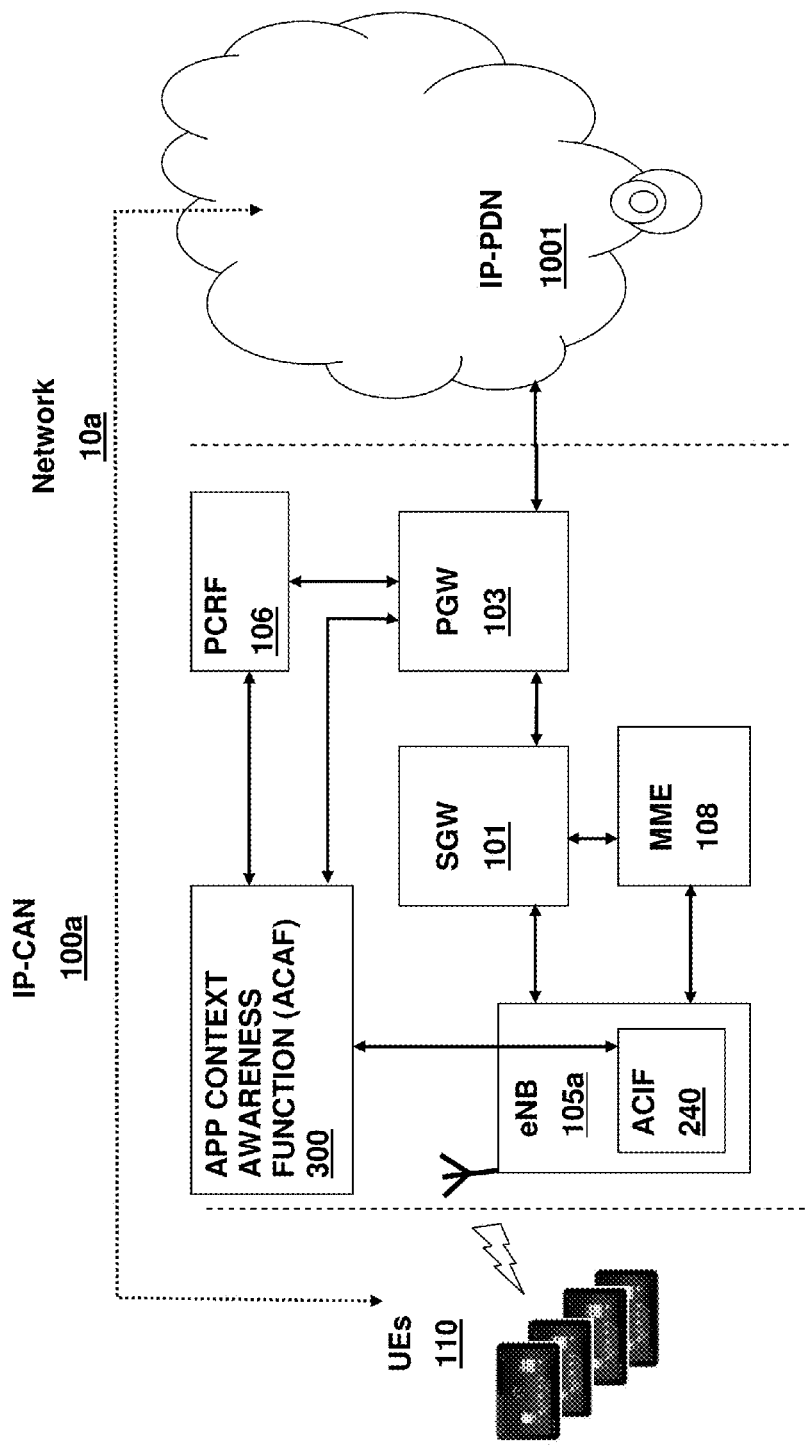
FIG. 3. LTE network with Application Context Identification and Awareness Function (ACAIF) consisting of ACIF 240 and ACAF 300

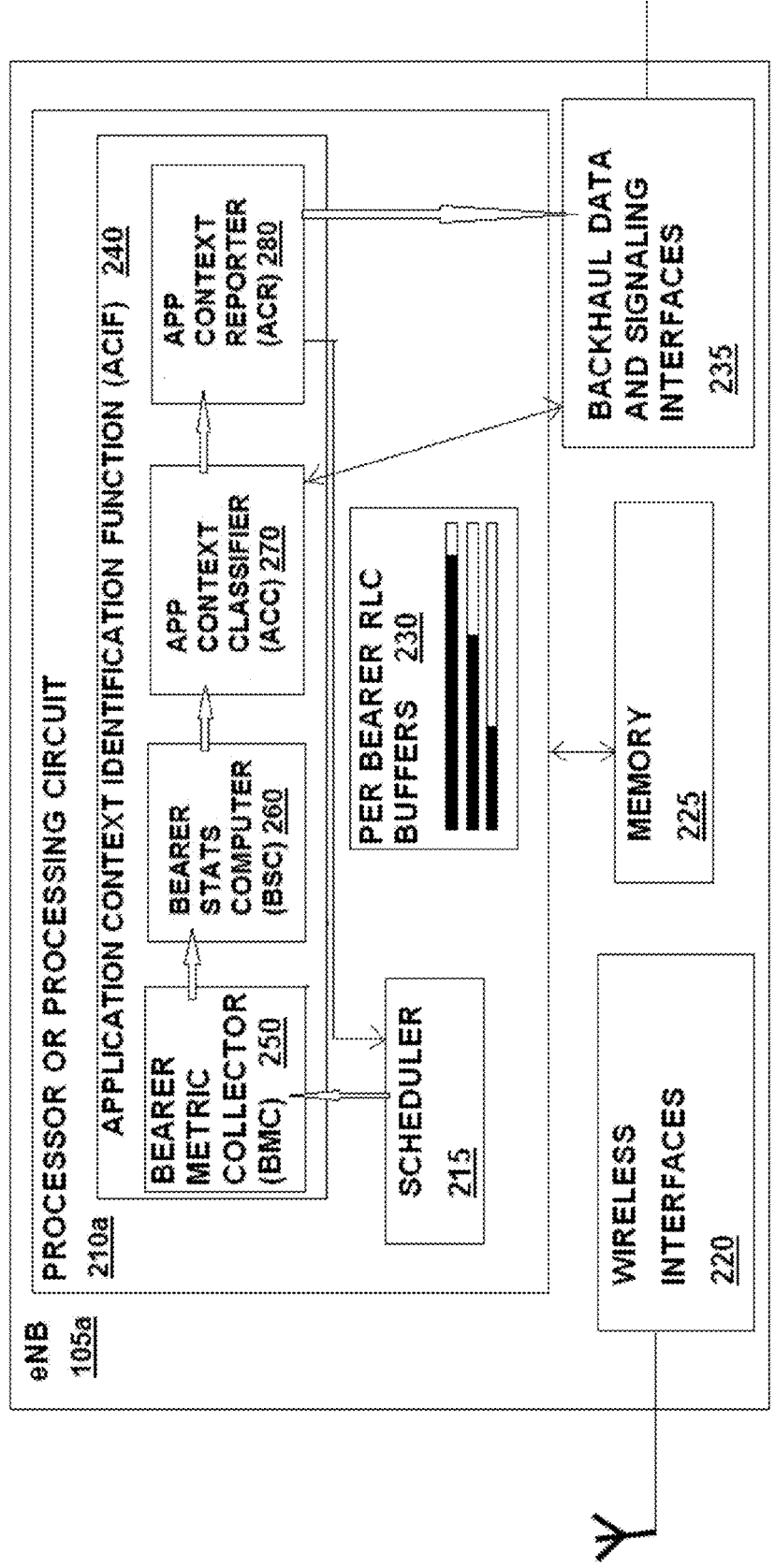
FIG. 4  eNodeB with added Application Context Identification Function (ACIF)

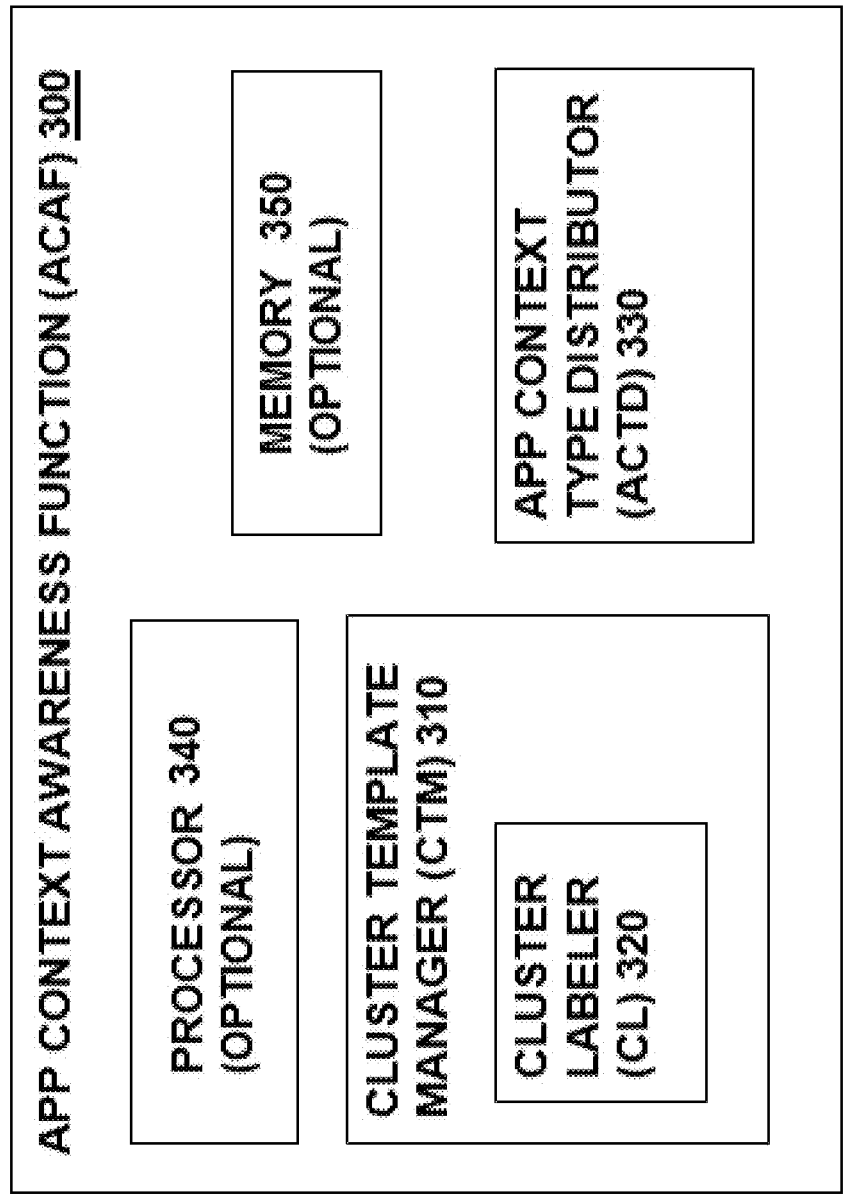
FIG. 5. Application Context Awareness Function (ACAF)

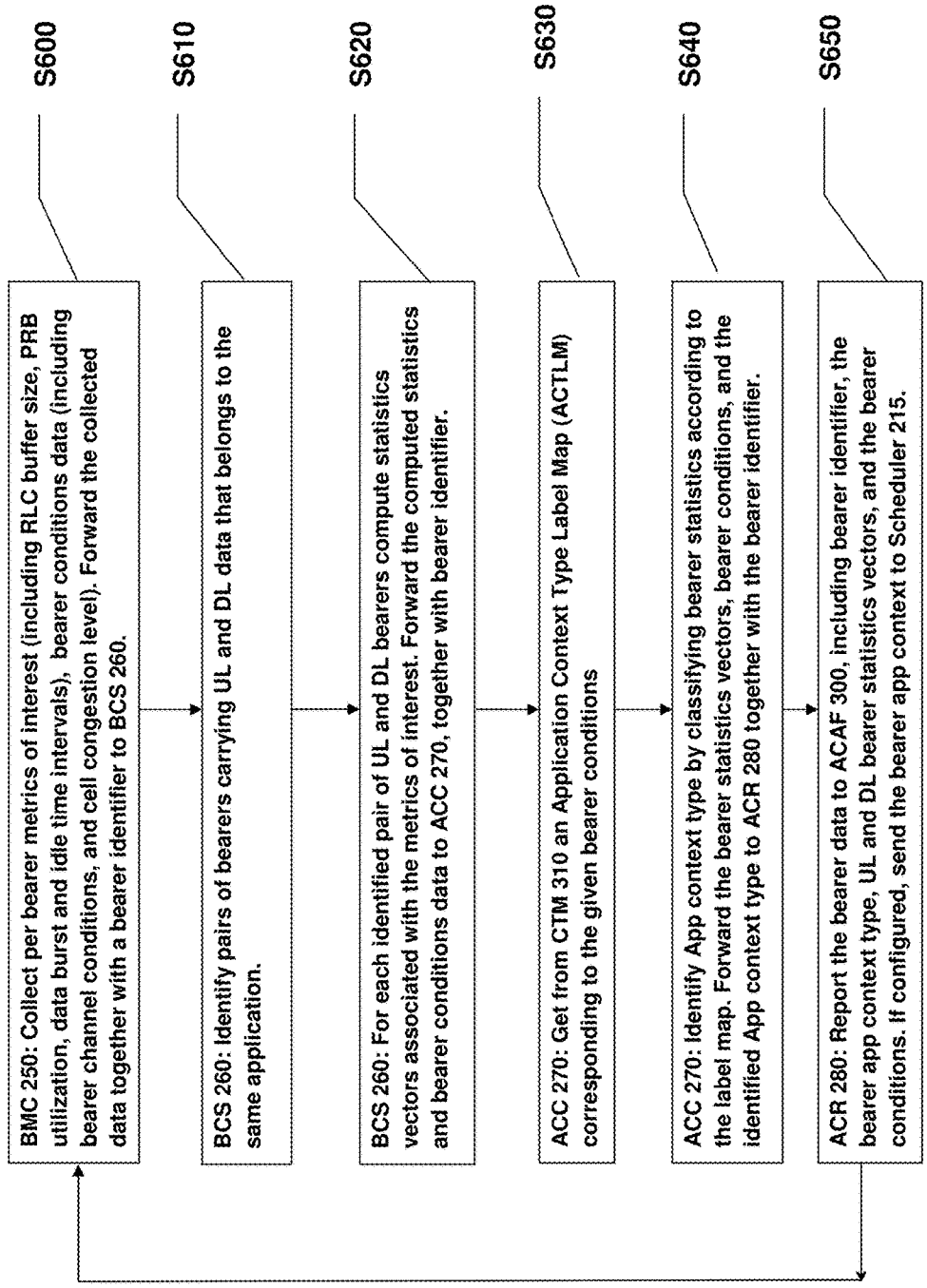
FIG. 6  Operation of ACIF 240

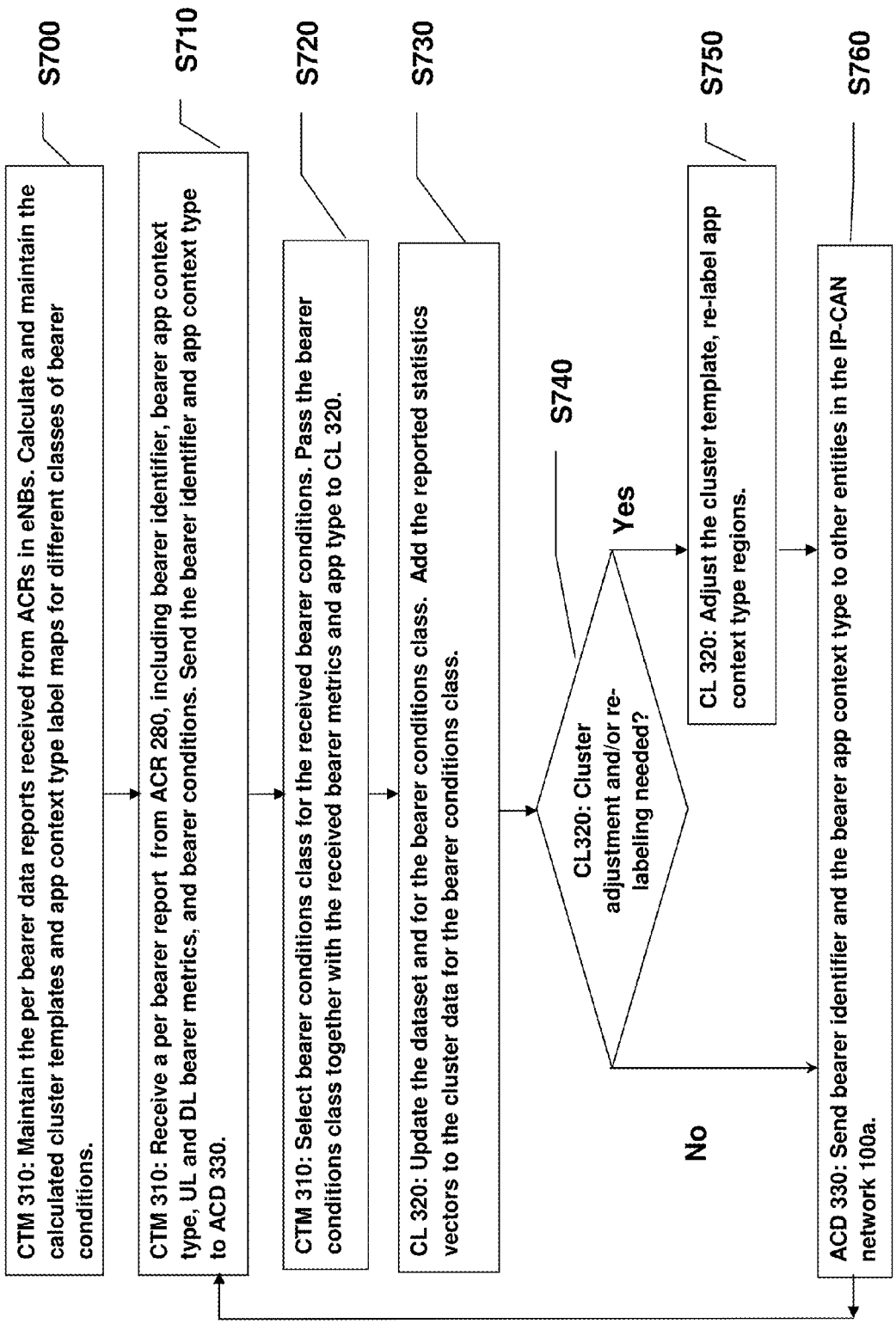

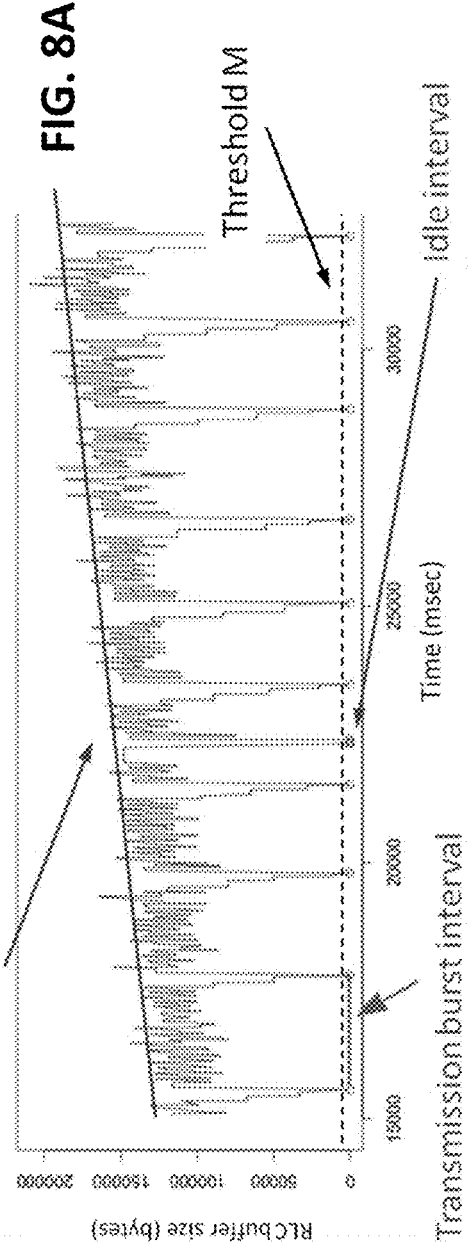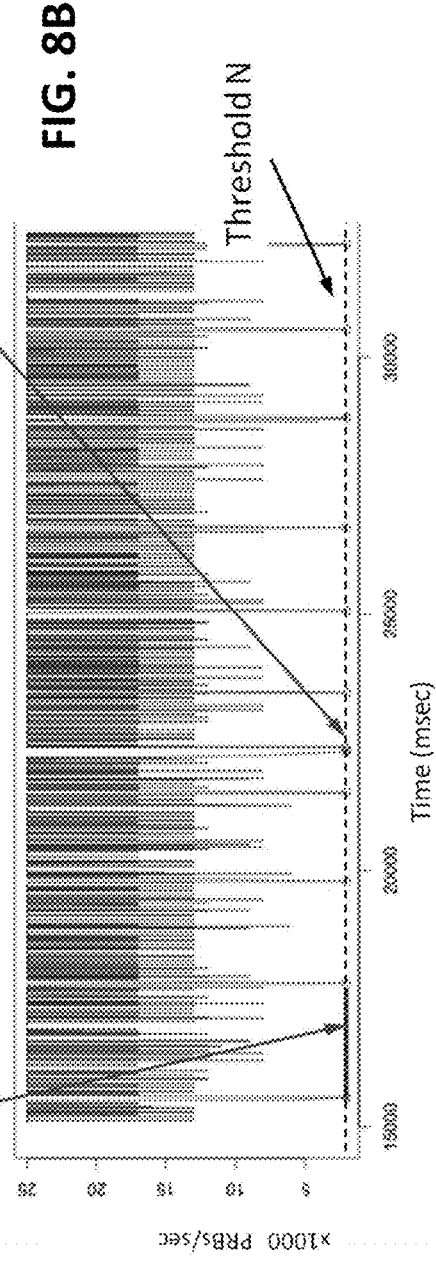

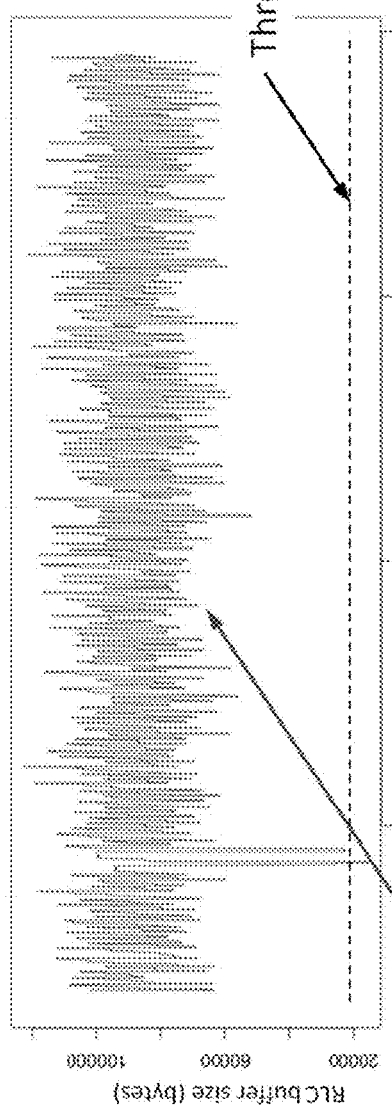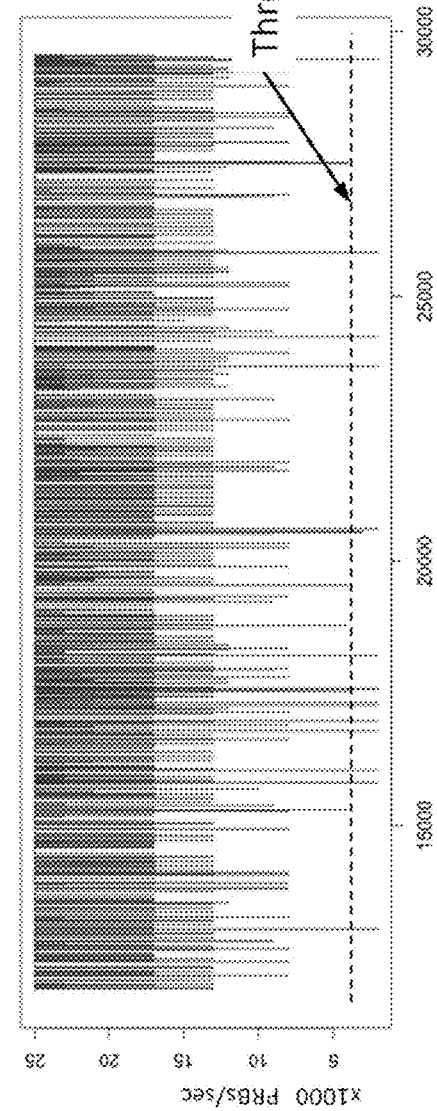

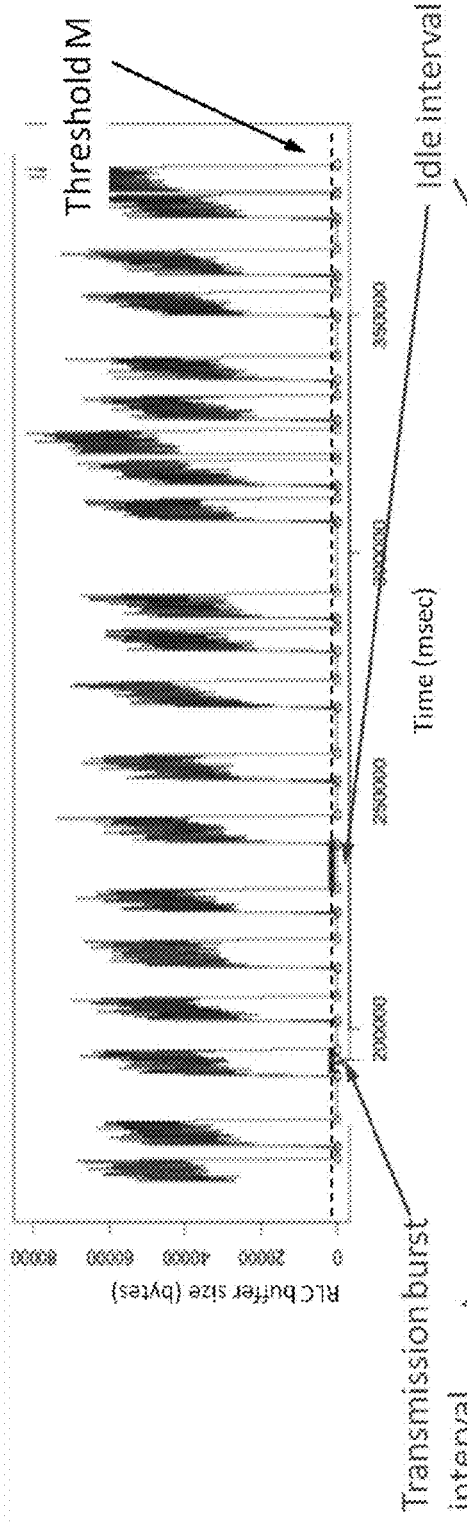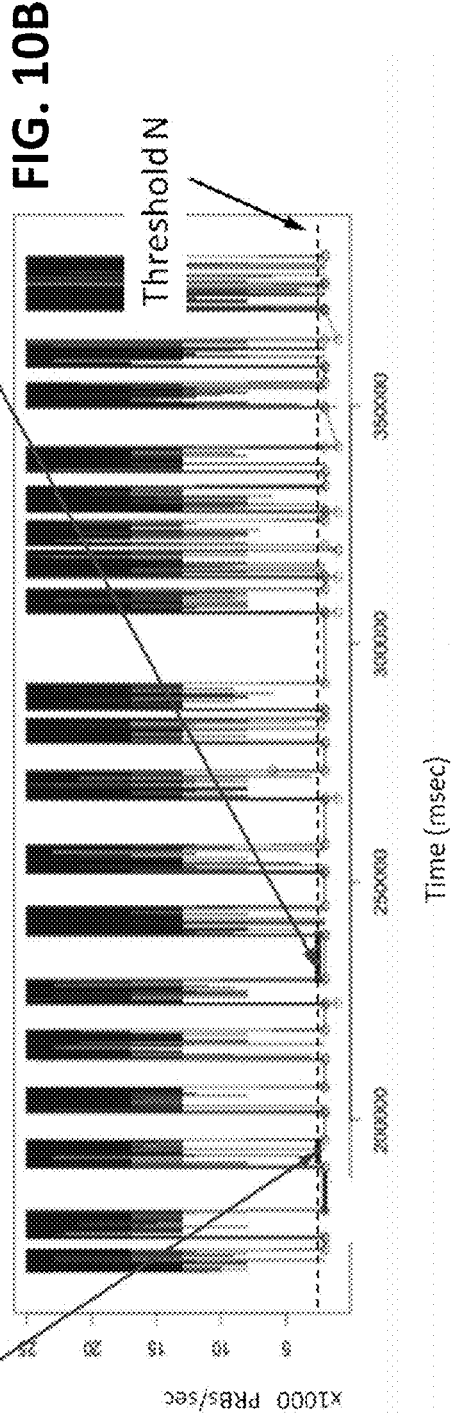
FIG. 10A — RLC buffer size for a bearer carrying intermittent FTP
FIG. 10B — PRB allocation for a bearer carrying intermittent FTP

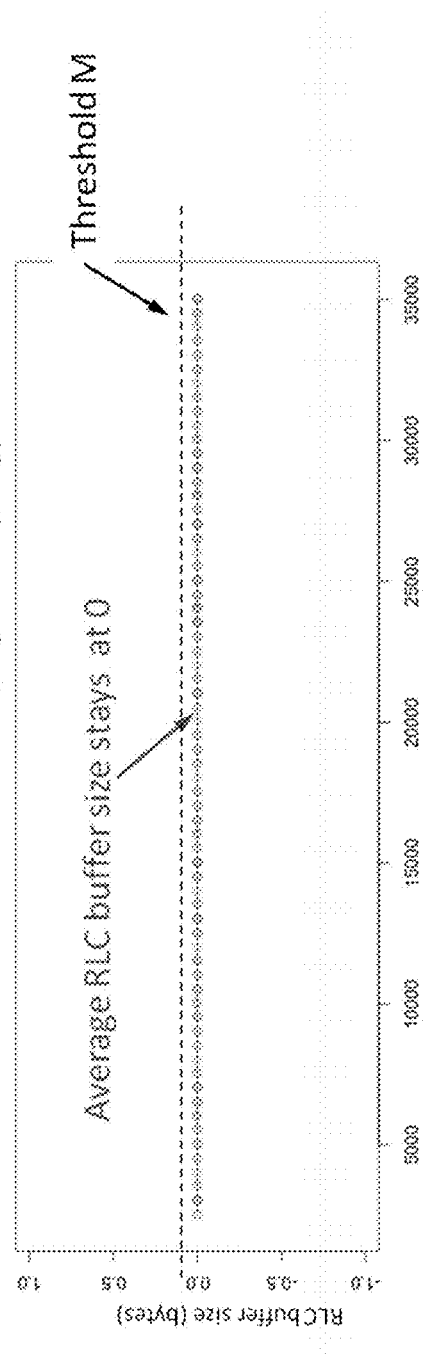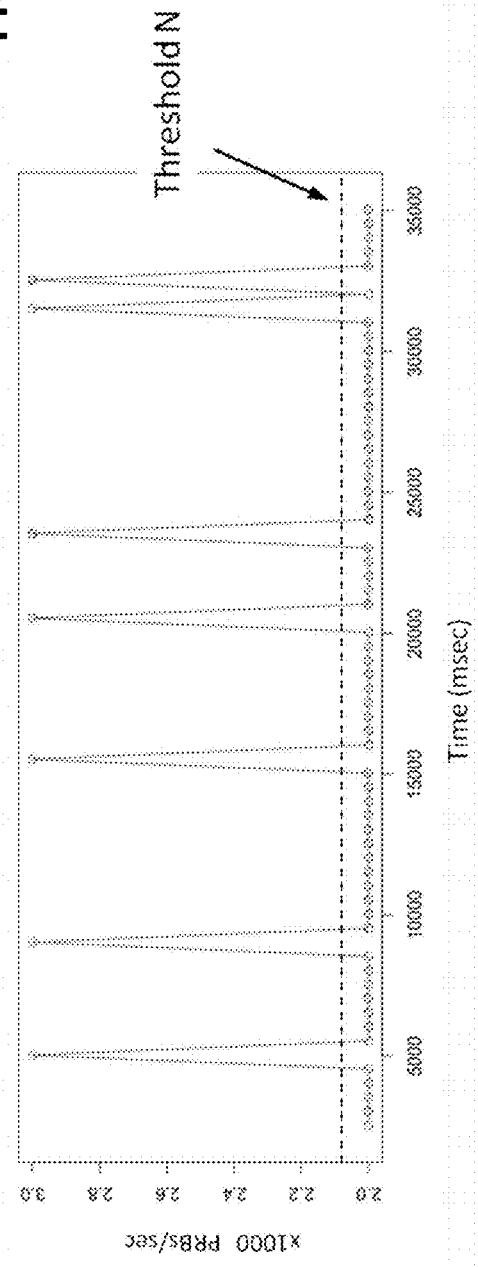

FIG. 12

|  | Metrics derived from RLC buffer size | | | | Metrics derived from PRB allocation | | | |
| --- | --- | --- | --- | --- | --- | --- | --- | --- |
|  | $E^1$ | $E^2$ | $V^2$ | | $E^3$ | $E^4$ | $V^4$ | |
| HAS | High | Low | Low | | High | Low | Low | |
| FTP | Med | ~1 | ~0 | | Med | ~0 | ~0 | |
| IFTP | Low | Low | * | | Low | Med | High | |
| PING | ~0 | ~0 | ~0 | | (very) Low | ~1 | Low | |

METHOD AND SYSTEM FOR CONTROLLING AN OPERATION OF AN APPLICATION BY CLASSIFYING AN APPLICATION TYPE USING DATA BEARER CHARACTERISTICS

BACKGROUND OF THE INVENTION

Field of the Invention

Example embodiments relate generally to a system and method for controlling an operation of an application by classifying an application type for data bearers based on data bearer characteristics.

Related Art

FIG. 1 illustrates a conventional 3$^{rd}$ Generation Partnership Project Long-Term Evolution (3GPP LIE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (POW) 103; a policy and charging rules function (PCRF) 106; a mobility management entity (MME) 108 and E-UTRAN Node B (eNB) 105 (i.e., base station, for the purposes herein the terms base station and eNB may be used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between 3$^{rd}$ Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility between 3GPP and non-3GPP technologies, such as Worldwide Interoperability for Microwave Access (WiMAX) and 3$^{rd}$ Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.203 "Policy and Charging Control Architecture."

FIG. 2 illustrates a conventional E-UTRAN Node B (eNB) 105. The eNB 105 includes: a memory 225; a processor 210; a scheduler 215; wireless communication interfaces 220; radio link control (RLC) buffers 230 for each bearer; and a backhaul interface 235. The processor 210 may also be referred to as a core network entity processing circuit, an EPC entity processing circuit, etc. The processor 210 may consist of one or more core processing units, either physically coupled together or distributed. The processor 210 controls the function of eNB 105 (as described herein), and is operatively coupled to the memory 225 and the communication interfaces 220. While only one processor 210 is shown in FIG. 2, it should be understood that multiple processors may be included in a typical eNB 105. The functions performed by the processor may be implemented using hardware. Such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the wireless communication interfaces 220 include various interfaces including one or more transmitters/receivers connected to one or more antennas to transmit/receive wirelessly control and data signals to/from UEs 110. Backhaul interface 235 is the portion of eNB 105 that interfaces with SGW 101, MME 108, other eNBs, or interface to other EPC network elements and/or RAN elements within IP-CAN 100. The scheduler 215 schedules control and data communications that are to be transmitted and received by the eNB 105 to and from UEs 110. The memory 225 may buffer and store data that is being processed at eNB 105, transmitted and received to and from eNB 105.

Every Transmission Time Interval (TTI), typically equal to 1 millisecond, the scheduler 215 may allocate a certain number of Physical Resource Blocks (PRBs) to different bearers carrying data over the wireless link in the Downlink direction (i.e., transmitting buffered data, located in Radio Link Control (RLC) buffer 230, from eNB 105 to UE 110) and Uplink direction (i.e., receiving data at eNB 105 from UE 110, which is received over wireless interface 220 and subsequently forwarded to the SGW 101 over backhaul 235). A "bearer" may be understood to be a virtual link, channel or data flow used to exchange information for one or more applications on the UE 110. The scheduler 215 may determine Modulation and Coding Schema (MCS) that may define how many bits of information may be packed into the allocated number of PRBs. The latter is defined by the 3GPP TS36.213 tables 7.1.7.1-1 and 7.1.7.2.1-1 (the contents of which is incorporated by reference in its entirety), where MCS is defined by a number between 0 and 28, where higher MCS values indicate that more bits may be packed in the allocated number of PRBs. The tables 7.1.7.1-1 and 7.1.7.2.1-1 include a lookup table for a number of bits of data that may be included in PRBs sent per TTI for a given allocated number of PRBs and a MCS value. MCS is computed by the scheduler using Channel Quality Indicator (CQI) values reported by the UE 110 that in turn may be derived from measured UE 110 wireless channel conditions in the form of Signal to Interference and Noise Ratio (SINR).

Scheduler 215 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

While the scheduler 215 operations are not standardized, there may be certain generic types of schedulers that may generally be accepted. Examples include strict priority scheduler (SPS) and proportional weighted fair share scheduler (PWFSS). Both types try to honor GBR needs first by allocating dedicated resources to meet whenever possible the GBR bearer throughput constraints while leaving enough resources to maintain certain minimal data traffic for non-GBR classes. The SPS allocates higher priority classes with the resources that may be needed (except for a certain minimal amount of resources to avoid starving lower priority classes), and lower priority classes generally receive the remaining resources. The PWFSS gives each non-GBR QCI class certain weighted share of resources, that may not be exceeded unless unutilized resources are available.

Conventionally, data traffic of over the top mobile applications run on UEs is predominantly carried over a network using best efforts (BE) bearers. The term "best efforts" generally indicates that the bearer traffic does not enjoy a guaranteed bit rate, and the bearer therefore does not offer a guaranteed Quality of Service (QoS). However, different over the top mobile applications often have differing QoS needs and/or requirements. Having the eNB 105 be aware of the 'application type context' for an application traffic carried over a specific BE bearer to a UE, such as knowing whether the bearer is carrying a HTTP Adaptive Streaming (HAS) video on demand, a live video broadcast, a live conversational video, a large file transfer protocol (ftp) application, web browsing search, email data, an intermittent ftp application (for instance), may successfully enable a variety of techniques that may be used to improve end user Quality of Experience (QoE) for the specific mobile application. The term 'application type context' may be considered synonymous with the terms 'application type' and 'application context type,' which are used interchangeably throughout this document.

An example of a technique used to improve QoE may include a bearer context type aware resource allocation that may be implemented by eNB scheduler 215, where different scheduling policies may be applied to a BE bearer depending upon the application context that the bearer carries. Such scheduling policy differentiation may be especially beneficial under congestion conditions.

Conventionally, an application context type of bearer traffic may be obtained by applying deep packet inspection (DPI). The Open System Interconnection (OSI) model partitions communication system into 7 conceptual layers. Starting from the bottom, these layers are: Physical, Data link, Networking, Transport, Session, Presentation, and Application. The data packets in the network contain a layer of headers that allow routing and processing of the packets. The outer-most header corresponds to the lowest layer. In the IP network, packets are routed using the Internet Protocol (IP) header that represents the Networking layer. DPI generally involves inspecting and classifying application IP packet headers that are located beyond an IP header layer (i.e., packet headers that belong to OSI layers 4-7, starting from Transport layer). The Transport layer 4 may typically be represented by Transmission Control Protocol (TCP) or User Datagram Protocol (UDP) headers and may be responsible for an order delivery and integrity verification of application session packets. In the case of TCP, the Transport layer 4 may also responsible for reliable delivery of an application session packets. The Session layer 5 provides the mechanism for opening, closing and managing a session between end-user application processes DPI techniques may classify application type and context by snooping layer 4 and layer 5 headers, including source and destination TCP and UDP port numbers in the TCP or UDP headers, and applying well known associations of the port numbers with specific applications. When such port numbers provide insufficient information, DPI can further look at Session layer headers, for example, presence of Real Time Streaming Protocol (RTSP) session headers may indicate that the data packet belongs to a live conversation video application.

DPI techniques have several significant drawbacks. First, a greater number of applications utilize end-to-end data traffic encryption (such as YouTube, Netflix, Skype, etc), and this encryption does not allow DPI techniques to be performed on the data flow at the wireless access networks, since the layers 4-7 in the IP data packets may be encrypted. Second, even when a data flow is not encrypted, adding DPI capabilities at an eNB (where the real need exists for application context type knowledge) may be costly. 3GPP currently defines PGW to host a DPI function, whereas eNB may perform a simple data flow switching from a per bearer General Packet Radio Service (GPRS) Tunneling Protocol (GTP) tunnel to an over the air bearer flow by using a single identifier field from the tunnel header. Therefore, adding a DPI function at eNB may require costly hardware upgrades. Alternatively, passing via signaling the determined application context information from PGW to eNB may also require non-trivial standards change.

SUMMARY OF INVENTION

At least one example embodiment relates to a method of controlling an operation of an application by classifying an application type.

In one example embodiment, the method includes obtaining, by one or more processors of at least one network node, bearer metrics for one or more bearers; computing, by the one or more processors, statistics vectors for the bearer metrics; classifying, by the one or more processors, the application type by locating points on a label map corresponding to the statistics vectors to obtain application type information; and exporting, by the one or more processors, the application type information to a node processor of a network node to control an operation of an application.

In one example embodiment, the exporting includes exporting the application type information to at least one of a node processor running an application function, a node processor of an e-Node B, and a node processor of a user equipment, and a node processor of a management entity node in order to control the operation of the application.

In one example embodiment, the obtaining includes obtaining per bearer metrics that are at least one of a radio link control (RLC) buffer size, a physical resource block (PRB) utilization, a transmission burst interval and an idle time interval.

In one example embodiment, the obtaining further includes obtaining bearer condition information and bearer identifier information, the bearer condition information including at least one of bearer channel condition information and cell congestion level information.

In one example embodiment, the computing further includes, identifying pairs of bearers associated with the obtained bearer metrics, wherein each pair of bearers belongs to a same application and includes a first bearer carrying uplink transmissions and a second bearer carrying downlink transmissions, computing the statistics vectors for bearer metrics for each of the identified pairs of bearers.

In one example embodiment, the method further includes obtaining the label map by, obtaining bearer reports on previously classified bearers, calculating cluster centroids and defined cluster regions for at least one particular application type, the label map including the calculated cluster centroids and defined cluster regions for the at least one particular application type.

In one example embodiment, the bearer reports include previously determined bearer information on a per-bearer basis for the previously classified bearers including at least one of bearer identifiers, previously identified application types, previously computed statistics vectors, previously determined bearer conditions, and previously determined information on pairings of the bearers.

In one example embodiment, the classifying further includes, locating points on or near the defined cluster regions of the label map that correspond to the statistics vectors, wherein the defined cluster region associated with the at least one particular application type that is closest to each located point is determined to be the classified application type.

In one example embodiment, the steps associated with the obtaining of the label map is repeated as application types for additional bearers are classified into one of the particular application types.

At least one example embodiment includes a network node.

In one example embodiment, the network node includes one or more processors configured to, obtain bearer metrics for one or more bearers, compute statistics vectors for the bearer metrics, classify the application type by locating points on a label map corresponding to the statistics vectors to obtain application type information, and export the application type information to a processor network node to control an operation of an application.

In one example embodiment, the one or more processors is further configured to export the application type information by exporting the application type information to at least one of a node processor running an application function, a node processor of an e-Node B, and node processor of a user equipment, and a node processor of a management entity node in order to control the operation of the application.

In one example embodiment, the one or more processors is further configured to obtain the bearer metrics by obtaining per bearer metrics that are at least one of a radio link control (RLC) buffer size, a physical resource block (PRB) utilization, a transmission burst interval and an idle time interval.

In one example embodiment, the one or more processors is further configured to obtain the bearer metrics by obtaining bearer condition information and bearer identifier information, the bearer condition information including at least one of bearer channel condition information and cell congestion level information.

In one example embodiment, the one or more processors is further configured to compute statistics vectors by, identifying pairs of bearers associated with the obtained bearer metrics, wherein each pair of bearers belongs to a same application and includes a first bearer carrying uplink transmissions and a second bearer carrying downlink transmissions, computing the statistics vectors for bearer metrics for each of the identified pairs of bearers.

In one example embodiment, wherein the one or more processors is further configured to, obtain the label map by, obtaining bearer reports on previously classified bearers, calculating cluster centroids and defined cluster regions for at least one particular application type, the label map including the calculated cluster centroids and defined cluster regions for the at least one particular application type.

In one example embodiment, the bearer reports include previously determined bearer information on a per-bearer basis for the previously classified bearers including at least one of bearer identifiers, previously identified application types, previously computed statistics vectors, previously determined bearer conditions, and previously determined information on pairings of the bearers.

In one example embodiment, the one or more processors is further configured to classify the application type by, locating points on or near the defined cluster regions of the label map that correspond to the statistics vectors, wherein the defined cluster region associated with the at least one particular application type that is closest to each located point is determined to be the classified application type.

In one example embodiment, the one or more processors is further configured to repeat the steps associated with the obtaining of the label map as application types for additional bearers are classified into one of the particular application types.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 illustrates a conventional 3$^{rd}$ Generation Partnership Project Long-Term Evolution (3GPP LTE) network;

FIG. 2 illustrates a conventional E-UTRAN Node B (eNB);

FIG. 3 illustrates a reconfigured 3GPP LTE network, in accordance with an example embodiment;

FIG. 4 illustrates a reconfigured e-Node B, in accordance with an example embodiment;

FIG. 5 illustrates an Application Context Awareness Function, in accordance with an example embodiment;

FIG. 6 is a method of application type classification using bearer characteristics, in accordance with an example embodiment;

FIG. 7 is a method of generating application context type label maps, in accordance with an example embodiment;

FIG. 8A depicts an example of a detected radio link control (RLC) buffer for a bearer carrying a HTTP Adaptive Streaming (HAS) application, in accordance with an example embodiment;

FIG. 8B depicts an example of a detected physical resource block (PRB) allocation for a bearer carrying a HTTP Adaptive Streaming (HAS) application, in accordance with an example embodiment;

FIG. 9A depicts an example of a detected radio link control (RLC) buffer for a bearer carrying a file transfer protocol (FTP) application, in accordance with an example embodiment;

FIG. 9B depicts an example of a detected physical resource block (PRB) allocation for a bearer carrying a file transfer protocol (FTP) application, in accordance with an example embodiment;

FIG. 10A depicts an example of a detected radio link control (RLC) buffer for a bearer carrying an intermittent file transfer protocol (FTP) application, in accordance with an example embodiment;

FIG. 10B depicts an example of a detected physical resource block (PRB) allocation for a bearer carrying an intermittent file transfer protocol (FTP) application, in accordance with an example embodiment;

FIG. 11A depicts an example of a detected radio link control (RLC) buffer for a bearer carrying an internet control message protocol (ICMP, or "ping") message, in accordance with an example embodiment;

FIG. 11B depicts an example of a detected physical resource block (PRB) allocation for a bearer carrying an internet control message protocol (ICMP, or "ping") message, in accordance with an example embodiment;

FIG. 12 is a table relating application types to bearer characteristics, in accordance with an example embodiment;

DETAILED DESCRIPTION

Figure 13A:
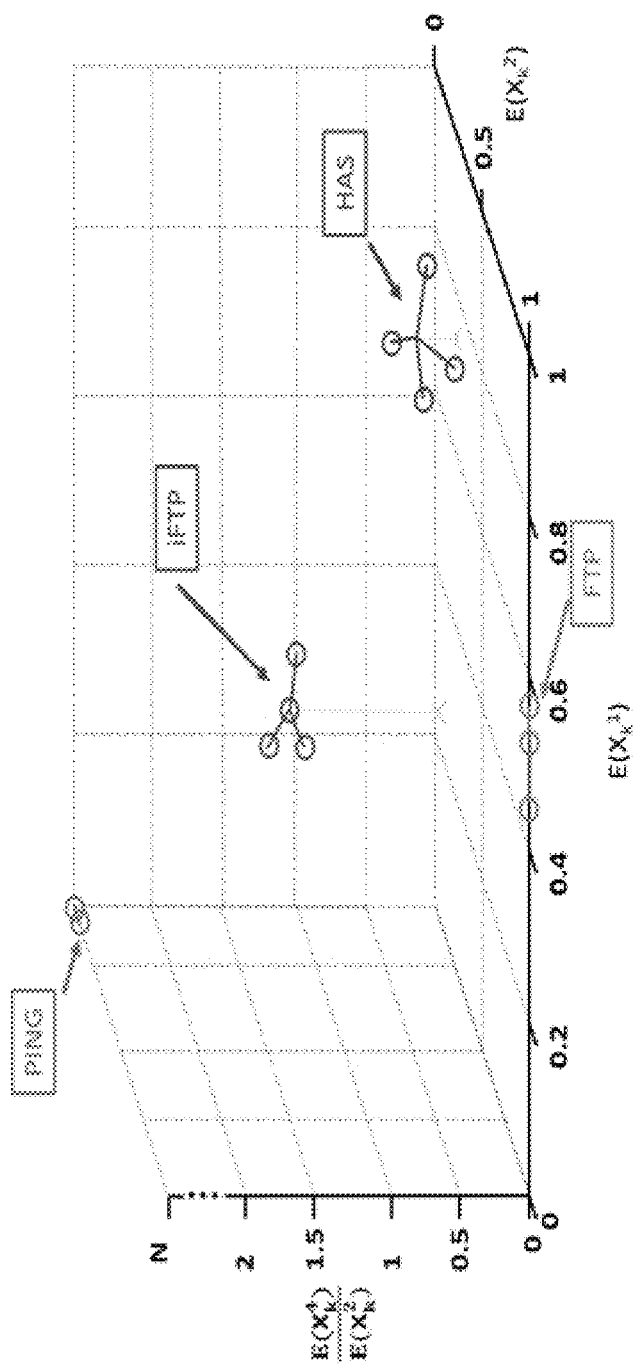
FIG. 13A depicts an example of clustering of different application types, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

Example embodiments obtain information on an application context (i.e., an application "type") for individual bearers of a radio access network cell. The knowledge of the application type implies an application Quality of Service (QoS) for an application associated with a best efforts (BE) radio access bearer, which may be obtained without the need for applying deep packet inspection (DPI).

In general, an application type may be identified by applying data analysis with clustering techniques for specific bearer metrics available at an eNB. Example embodiments may be well suited for bearers carrying traffic that either belongs to a single mobile application type, or traffic that belongs to multiple simultaneous application types, with one of the application types being predominant in terms of data volume. Example embodiments may be implemented for mobile applications on smartphones and tablets, where there is typically a single dominant foreground application (e.g. video, web browsing, social networking applications).

FIG. 3 illustrates a reconfigured 3GPP LTE network 10a. Network 10a may include identical components as those shown in 3GPP LTE network 10 of FIG. 1, with the following differences. First, IP-CAN 100a may include a reconfigured eNB 105a (shown in FIG. 4 below) that may include an Application Context Identification Function (ACIF) 240, the function of which is further described in FIG. 4 and FIG. 6. Second, IP-CAN 100a may include an Application Context Awareness Function (ACAF) 300, the function of which is further described in FIG. 5 and FIG. 7. It should be understood that ACAF 300 may be included as a stand-alone, dedicated server (as shown in FIG. 3), which may be controlled by a dedicated server processor. Alternatively, ACAF 300 may instead be included in eNB 105a, or in any another existing node (for example MME 108 or SGW 101) that may be proximally close to eNB 105a and within IP-CAN 100a.

FIG. 4 illustrates a reconfigured e-Node B (eNB) 105a, in accordance with an example embodiment. In particular, the reconfigured eNB 105a may include the addition of an application context identification function (ACIF) 240, which may interface with scheduler 215, RLC buffers 230 and the backhaul interfaces 235. Specifically, ACIF 240 may include the following components: a bearer metric collector (BMC) 250, a bearer statistics computer (BSC) 260, an application context classifier (ACC) 270, and an application context reporter (ACR) 280. The function of the components of the ACIF 240 is defined and explained with regard to the flowchart of FIG. 6, described below.

FIG. 5 illustrates an Application Context Awareness Function (ACAF) 300, in accordance with an example embodiment. The ACAF 300 may include the following components: a cluster template manager (CTM) 310, which in turn may include a cluster labeler (CL) 320, and an application context distributor (ACID) 330. ACAF 300 may optionally include memory 350 and a processor 340, in the event that ACAF 300 is a dedicated, stand-alone server (as shown in FIG. 3). In the event ACAF 300 is contained within eNB 105a, or another existing network node, the dedicated memory 350 and processor 340 may not be needed. The function of the components of the ACAF 300 is defined and explained with regard to the flowchart of FIG. 7, described in detail below.

FIG. 6 is a method of application type classification using bearer characteristics, in accordance with an example embodiment. The discussion of FIG. 6 refers to the function of the components of ACIF 240 (shown in FIG. 4), where the steps are described as being performed by processor 240. With regard to FIG. 6, it should be understood that application data consumption patterns may be characterized using some of the following indicators:

(a) characteristics of data rates sent/received by an application, (b) characteristics of data transmission bursts (durations, peaks, etc.), (c) durations of idle periods, which are periods when no data is sent, and (d) 'pull versus push' modes of data transmission.

It should be understood that a 'pull mode' is when an application endpoint (e.g. client on a mobile device) sends a request in order to get data from the network, where this request is sent to an application peer so that the application endpoint may receive data (as a response to the request). A 'push mode' involves an application endpoint sending data without a previous request. Examples of applications operating in pull mode include HTTP Adaptive Streaming (HAS) video, File Transfer Protocol (FTP), Web browsing. Examples of applications operating in push mode include live conversational video, or video broadcast.

In order to characterize the indicators listed above, in step S600, processor 240 may cause BMC 250 to collect the following per bearer metrics of interest that may be subsequently sent to BCS 260:

(1a) For a downlink bearer, an average RLC buffer size (occupancy) over a time interval $\Delta t_1$, where time $\Delta t_1$ may be for example configured to be between 1 second and 50 milliseconds.

(1b) For an uplink bearer, the buffers storing data prior to wireless transmission may be located at the UE 110. Therefore, for an uplink bearer, the metric of interest may be defined as an average amount of bearer data received over a wireless link during a time interval $\Delta t_1$, where $\Delta_1$ may be configured to be the same as in metric (1a).

(2a) For a downlink bearer, length (duration) and frequency of continuous time intervals during which an averaged (over time interval $\Delta t_2$) RLC buffer size stays above M bytes, where M may be for example configured to be between 0 and 10000 bytes. The time $\Delta t_2$ may be configured between 0 and 1000 milliseconds. These time intervals may represent transmission bursts (the indicator (b) above) as measured through RLC buffer size indicator. The gaps between these time intervals (transmission bursts) represent transmission idle times (the indicator (c) above) as measured through RLC buffer size indicator. When M is configured to be 0, these measurements represent a length and frequency of time intervals during which RLC buffers are non-empty, which may serve as a characterization of transmission bursts for a bearer carrying traffic of a single application. M may be configured to be greater than 0 to characterize transmission bursts of a dominant application for a bearer carrying one dominant application and one or more background applications.

(2b) For an uplink bearer, the buffers storing data prior to wireless transmission may be located at the UE 110. Therefore, a metric of interest for an uplink bearer may be defined identically to the metric (2a), but for the purpose of tracking an amount of bearer data received over wireless link, as opposed to tracking an RLC buffer size.

Throughout the rest of the document, for simplicity the metrics (1) and (2) shall be referred to in the context of downlink bearers (referring to (1a) and (2a)). The same description shall apply to uplink bearers, with the difference that for uplink bearers, this metric relates to an amount of bearer data received over wireless link, rather than an RLC buffer size.

(3) An average number of PRBs allocated to the bearer by the scheduler over time interval $\Delta t_1$ (where this metric applies equally to both uplink and downlink bearers). The time interval $\Delta t_1$ may be configured the same as for the metric (1) above.

(4) Length (duration) and frequency of continuous time intervals (averaged over time interval $\Delta t_3$) during which a PRB utilization may be below a threshold of N PRBs per second (where this metric applies equally to both uplink and downlink bearers). These time intervals may represent idle periods (the indicator (c) above) as measured through PRB utilization. The gaps between these time intervals may represent transmission burst times (the indicator (b) above), as measured through PRB utilization. The time interval $\Delta t_3$ may be configured for example between 20 and 200 milliseconds, in order to account for the scheduler 215 not allocating resources to the bearer due to the resources being allocated to other bearers (and not because there is no data to transmit). The time interval $\Delta t_3$ may also be configured as a variable depending upon the current number of bearers served by the scheduler. The threshold N may be configured to range, for example, between 0 and 500 PRBs per second. When N is configured to be 0, these measurements represent length and frequency of time intervals during which no resources are allocated by a fair scheduler, which serves as a characterization of idle times for a bearer carrying traffic of a single application. N may be configured to be greater than 0, in order to characterize idle times of a dominant application for a bearer carrying one dominant application and one or more background applications.

The metrics (1) and (3) may characterize indicators (a), (b) and (c) since these metrics reflect an amount of data that the application receives/sends from/to the network and the frequency of these data transmissions. In addition, observable patterns in metric (1a) may be indicative of a transmission control protocol (TCP) congestion window behavior. Peaks in metrics (1) and (3) may indicate transmission bursts (characterizing indicator (b)), whereas prolonged periods of an empty (or below the threshold M) RLC buffer and zero (or below the threshold N) average PRB utilization may characterize idle periods (which characterize indicator (c)). The metrics (2) and (4) may provide a specific characterization of indicators (b) and (c). In order to collect the metrics (1) through (4) described above, sequences may be collected every time unit (where the time unit is equal to frequency at which the scheduler 215 is scheduling resources and may be equal to 1 millisecond) for each bearer k, denoted by:

$$R_k := \{r_k(n): n=0,1,2,\ldots\} \quad \text{Equation 1}$$

$$\text{and } P_k := \{p_k(n): n=0,1,2,\ldots\} \quad \text{Equation 2}$$

Where n may be a time unit number; $p_k(n)$ may be a number of PRBs allocated to bearer k during the time unit n which may be obtained from the scheduler 215; for a downlink bearer k $r_k(n)$ may be RLC buffer size for the bearer k at time n; for an uplink bearer k $r_k(n)$ may be the amount of bearer k data received over wireless link without errors during the time unit n which may be obtained from the scheduler 215.

The above-mentioned four metrics (1)-(4) computed from the sequences $R_k$ (Equation 1) and $P_k$ (Equation 2) for a bearer k may be denoted by $X_k^i$, i=1, 2, 3, 4, respectively. The metrics $X_k^1$ and $X_k^3$ may be computed as sequences of averages at every time unit m as follows $$X_k^i := \{x_k^i(m): m=1,2,\ldots\} \text{ for } i=1,3 \quad \text{Equation 3}$$

$x_k^1(m)$ may be an average size of the RLC buffer over the time interval of duration $\Delta t_1$ that ends at the measuring time point m (T being the number of time units in the time interval $\Delta t_1$, and $\Delta t_1$ being defined in the metric (1) above).

$$x_k^1(m) := \frac{\sum_{j=m-T+1}^{m} r_k(j)}{T} \qquad \text{Equation 4}$$

$x_k^3(m)$ may be the average PRB allocation over the time interval of duration $\Delta t_1$ that ends at the measuring time point m (T being the number of time units in the time interval $\Delta t_1$, and $\Delta t_1$ being defined in the metric (1) above).

$$x_k^3(m) := \frac{\sum_{n=m-T+1}^{m} p_k(n)}{T} \qquad \text{Equation 5}$$

The metrics $X_k^2$ and $X_k^4$ for a bearer k may be computed as sequences of durations of data burst and idle time intervals respectively:

$$X_k^i := \{x_k^i(l) : l=1,2,\ldots\} \text{ for } i=2,4 \qquad \text{Equation 6}$$

where $x_k^i(l)$ for i=2, 4 may be computed as follows.

$$x_k^i(l) = \alpha_i R_k^i(l) + (1-\alpha_i) P_k^i(l), \text{ for } i=2,4 \qquad \text{Equation 7}$$

Where $R_k^i(l)$ being length (duration) of a time interval number l computed using RLC buffer sizes data $R_k$ (from the Equation 1), $P_k^i(l)$ being length (duration) of a time interval number l computed using PRB utilization data $P_k$ (from the Equation 2), $\alpha_i$ being a configured number between 0 and 1 representing relative weight of determining the length of corresponding time interval number l using RLC buffers versus determining the length of the corresponding time interval number l using PRB utilization. The index i=2 denotes durations of transmission burst time intervals, the index i=4 denotes durations of idle time intervals. Example embodiments for computation of $R_k^i(l)$ and $P_k^i(l)$ follow.

In one example embodiment $R_k^2(l)$ may be computed as a sequence of lengths (durations) of the time intervals $(y_k^2(l), z_k^2(l))$ for which the averaged RLC buffer size may be at least M. The $y_k^2(l)$ being the start of the interval and $z_k^2(l)$ being the end of the time interval number l may be computed as follows:

$$y_k^2(l) := \max\{n > z_k^2(l-1): \text{ such that } \overline{r_k}(n-1) < M \text{ and } \overline{r_k}(n) \geq M\} \qquad \text{Equation 8,}$$

$$z_k^2(l) := \max\{n > y_k^2(l): \text{ such that } \overline{r_k}(n-1) \geq M \text{ and } \overline{r_k}(n) < M\} \qquad \text{Equation 9,}$$

Where n being the corresponding time unit number; $\overline{r_k}(n)$ being averaged RLC buffer size over time interval from n-$\Delta t_2$ till n (of duration $\Delta t_2$) which may be computed using Equation 4, where for the purpose of this computation in Equation 4, m equates with n, and T equates with $\Delta t_2$, where m and $\Delta t_2$ being defined in the metric (2) above.

Where $y_k^2(l)$ and $z_k^2(l)$ being the left and the right endpoints respectively of the time interval number l for which averaged over time interval $\Delta t_2$ RLC buffer size may be greater than the variable M defined in the metric (2) above.

Then $R_k^2(l)$ may be computed as the length (duration) of the respective time interval as:

$$R_k^2(l) = z_k^2(l) - y_k^2(l) \qquad \text{Equation 10}$$

In one example embodiment $R_k^4(l)$ may be computed as a sequence of lengths (durations) of the gaps between the time intervals $(y_k^2(l), z_k^2(l))$ determined by the Equations 8 and 9:

$$R_k^4(l) = y_k^2(l+1) - z_k^2(l) \qquad \text{Equation 11}$$

In one example embodiment $P_k^2(l)$ may be computed as a sequence of lengths (durations) of the time intervals $(y_k^2(l), z_k^2(l))$ for which the averaged PRB utilization may be at least N. The $y_k^2(l)$, being the start of the interval number l, and $z_k^2(l)$, being the end of the time interval number l, may be computed as follows:

$$y_k^2(l) := \max\{n > z_k^2(l-1): \text{ such that } \overline{p_k}(n-1) < N \text{ and } \overline{p_k}(n) \geq N\} \qquad \text{Equation 12,}$$

$$z_k^2(l) := \max\{n > y_k^2(l): \text{ such that } \overline{p_k}(n-1) \geq N \text{ and } \overline{p_k}(n) < N\} \qquad \text{Equation 13,}$$

Where n being the corresponding time unit number; $\overline{p_k}(n)$ may be the averaged PRB utilization over time interval from n-$\Delta t_3$ till n (of duration $\Delta t_3$), where $\overline{p_k}(n)$ may be computed using the Equation 4, where for the purpose of this computation in Equation 4 m equates with n, T equates with $\Delta t_3$, and where N and $\Delta t_3$ are defined in the metric (4), above. $y_k^2(l)$ and $z_k^2(l)$ computed using the Equations 12 and 13 being left and right endpoint of the time interval number l for which averaged PRB utilization may be less than the variable N defined in metric (4) above.

Then $P_k^2(l)$ may be computed as the length (duration) of the time interval:

$$P_k^2(l) = z_k^2(l) - y_k^2(l) \qquad \text{Equation 14}$$

In one example embodiment $P_k^4(l)$ may be computed as a sequence of lengths (durations) of the gaps between the time intervals $(y_k^2(l), z_k^2(l))$ determined by the Equations 12 and 13:

$$P_k^4(l) = y_k^2(l+) - z_k^2(l) \qquad \text{Equation 15}$$

Note that since the sequences $R_k^4(l)$ and $P_k^4(l)$, while representing lengths (durations) of gaps in data transmission bursts (e.a. idle times), also serve as indicators of frequencies of data transmission bursts. Similarly, $R_k^2(l)$ and $P_k^2(l)$ while representing lengths (durations) of data transmission bursts, also indicate gaps in data idle periods and therefore serve as indicators of frequencies of idle periods.

Note that $X_k^1$ and $X_k^3$ may be computed as sequences utilizing averaged value over a time window $\Delta t_1$ (where $\Delta t_1$ may be configured to be a time interval between 50 milliseconds and 1 second). The sequences $R_k^i(l)$ used for computing the metrics $X_k^i$, i=2, 4 may be computed using averaged values $\overline{r_k}(n)$ of RLC buffer size over a time window $\Delta t_2$ as a sequence of transmission burst time intervals for which $\overline{r_k}(n) \geq M$ holds for i=2, and as a sequence of idle time intervals for which $\overline{r_k}(n) < M$ holds for i=4. The sequences $P_k^i(l)$ used for computing the metrics $X_k^i$, i=2, 4 may be computed using averaged values $\overline{p_k}(n)$ of PRB utilization over a time window $\Delta t_3$ as a sequence of transmission burst time intervals for which $\overline{p_k}(n) \geq N$ holds for i=2, and as a sequence of idle time intervals for which $\overline{p_k}(n) < N$ holds for i=4. Configuration parameters M, N, $\Delta t_1$, $\Delta t_2$, $\Delta t_3$ may serve for tuning the four metrics $X_k^i$.

Other configuration parameters may include the parameters $\alpha_i$, i=2, 4 in the Equation 7. For example, configuring $\alpha_i=1$ results in the corresponding durations of time intervals in the metrics $X_k^i$, i=2, 4 being computed using only RLC buffer data. Configuring $\alpha_i=0$ results in the corresponding durations of time intervals in the metrics $X_k^i$, i=2, 4 being computed using only PRB utilization data. Configuring $\alpha_i=0.5$ results in the corresponding durations of time intervals being computed as a mean of durations computed both using RLC buffers data and PRB utilization data. Configuring $\alpha_i > 0.5$ yields more weight to RLC buffer data.

One special case may be a scenario where the averaged RLC buffer always remains almost empty (e.g. due to low volume and infrequent transmissions, as shown in FIG. 11A, for ICMP ping), i.e., $\bar{r}_k(n)$ may be always less than M for all n, so that $R_k^2$ may consist of a single element 0, and $R_k^4$ may consist of a single element equal to a large time duration l:

$$R_k^2:=\{0\}, R_k^4:=\{l\} \qquad \text{Equation 16}$$

Where l may be assigned a value equal to the length of the recorded bearer session, or some other predetermined large value.

Another special case may be a scenario where the RLC buffer may be always above the threshold M (e.g. as shown in FIG. 8A for FTP), i.e., $\bar{r}_k(n) > M$ for all n, so that $R_k^2$ may consist of a single element 0, and $R_k^4$ may consist of a single element equal to a large time duration l:

$$R_k^2:=\{l\}, R_k^4=\{0\} \qquad \text{Equation 17}$$

Where l may be the same as in the Equation 16.

Although measurements of $R_k$ and $P_k$ may be collected at small time scales such as 1 ms, the computation of the metrics and the processed statistics based on the sequence $X_k^i$, i=1, 2, 3, 4 may be applied at larger time scales according to operators preference on the tradeoff between computational cost and identification sensitivity.

In addition to per bearer metrics of interest described above, the BMC 250 in step S600 may collect bearer conditions data from the scheduler 215. The bearer conditions data may include channel conditions of the bearer and congestion level of the cell.

The bearer channel conditions may be collected in one or more of the forms, including an average Signal to Interference and Noise Ratio (SINR), an average Channel Quality Indicator (CQI) as reported by the UE 110, or an average Modulation Coding Schema (MCS) as reported by the scheduler 215.

In one example embodiment, the cell congestion level may be collected in the form of a integer value between 0 (no congestion) and a configured MC (maximal congestion) with each of the congestion level numbers mapped to a configured range of Maximal Average Number of PRBs Per Second (MAVNPPS) that may be available to the bearer as reported by the scheduler 215. For example, with 11 congestion levels configured, congestion level 0 may be configured to indicate MAVNPPS greater than 10000, congestion level 1 may be configured to indicate MAVNPPS between 9000 and 10000, . . . , congestion level 10 may be configured to indicate MAVNPPS between 1000 and 2000, and congestion level 11 may be configured to indicate MAVNPPS below 1000.

The BMC 250 may pass the collected per bearer metrics and conditions data together with the bearer identifier to BSC 260. The bearer identifier may be a numeric or alphanumeric sequence that uniquely identifies the bearer within the eNB 105a.

In step S610, processor 240 may cause BCS 260 to identify a 'composite bearers' consisting of pairs of bearers carrying uplink and downlink data belonging to a same application. The identification of a pair of bearers that constitute a 'composite bearer' may be performed at the time of the bearer creation by matching a combination of Access Point Name (APN) and Quality of Service (QoS) Class Identifier (QCI) for the uplink and downlink bearers for the same User Equipment (UE) endpoint, for example uplink and downlink Best Effort (BE) QCI 9 bearers with the same APN for the same UE. BSC 260 may also use time of creation of the uplink and downlink bearers for the same APN and the same UE, as an additional bearer matching criteria (i.e., bearers for the same application may be created very close to each other in time). By comparing the four metrics above for the identified pair of uplink and downlink bearers, BCS 260 may classify pull and push data transmissions, which may be used to characterize indicator (d). For example, large downlink bearer volume with small periodic uplink traffic may be indicative of TCP based downlink pull. Roughly equal large simultaneous uplink and downlink volume may be indicative of UDP or TCP based real time conversational video.

In step S420, for each pair of identified uplink and downlink bearers, statistical vectors may be determined for the metrics of interest $X_k^i$, i=1, 2, 3, 4 from the equations 3 and 6.

Although measurements of $R_k$ and $P_k$ may be collected at small time scales such as 1 ms, the computation of the metrics and the processed statistics based on the sequence $X_k^i$, i=1, 2, 3, 4 may be applied at larger time scales according to operators preference on the tradeoff between computational cost and identification sensitivity.

Statistics of Metrics of Interest:

To determine normal behavior for a bearer, a probability density function may be determined from collected sample sequences of the four metrics $X_k^i$, i=1, 2, 3, 4. Depending on a network operators' preferences related to computational costs, various methods for probability density estimation may optionally include: a histogram, a well-known parametric density estimation using Maximum Likelihood Estimation, and a non-parametric density estimation such as a kernel density estimation. In one example embodiment the metrics $X_k^i$, i=1, 2, 3, 4 may individually be characterized by their histograms $H_k^i = (h_{k,1}^i, \ldots, h_{k,Q_i}^i)$ for i=1, 2, 3, 4 where samples of the ith metric may be quantized into $Q_i$ intervals $(\lambda_1, \ldots, \lambda_{Q_i})$. The expectation and the variance of $X_k^i$ may then be estimated as follows:

$$E(X_k^i) \approx \Sigma_{q=1}^{Q_i} \lambda_q h_{k,q}^i \qquad \text{Equation 18}$$

$$V(X_k^i) \approx \Sigma_{q=1}^{Q_i} (\lambda_q - E(X_k^i))^2 h_{k,q}^i, \text{ for } i=1,2,3,4 \qquad \text{Equation 19,}$$

In one example embodiment, data consumption behavior of the bearer k can be characterized by a deliberate vector as follows, $$C_k := (H_k^i)_{i=1}^4 \in \mathbb{R}^{\Sigma_{i=1,2,3,4} Q_i} \text{ (Alternative I)} \qquad \text{Equation 20}$$

In another example embodiment, a simplified vector may be used as follows:

$$C_k := (E(X_k^i), V(X_k^i))_{i=1}^4 \in \mathbb{R}^8 \text{ (Alternative II)} \qquad \text{Equation 21}$$

accurate way to characterize the bearer k behavior may be determined by taking a joint performance of $X_k^i$, i=1, 2, 3, 4 into account and formulating a four-dimensional variable $Y_k$ where $y_k(n) := (x_k^1(n), x_k^2(n), x_k^3(n), x_k^4(n))^T \in \mathbb{R}^4$, where a four-dimensional histogram $H_k := (h_{k,1}, \ldots, h_{k,Q})$ may be computed with Q being a size of the discrete state space. Performance of the $k^{th}$ bearer may be characterized by:

$$C_k := H_k = (h_{k,1}, \ldots, h_{k,Q}) \in \mathbb{R}^Q \text{ (Alternative III)} \qquad \text{Equation 22}$$

In yet another example embodiment, a simplified vector may be used:

$$C_k := (E(Y_k), V(Y_k)) \in \mathbb{R}^8 \text{ (Alternative IV)} \qquad \text{Equation 23}$$

In yet another example embodiment, to better characterize a behavior of a bidirectional application, the computed statistical characteristics may include both uplink and downlink bearers carrying application traffic (e.g. BE uplink and BE downlink bearers for a given UE). For each of the alternatives listed above, a 'composite bearer' including a matching pair of downlink and uplink bearers may be represented, as follows:

$$C_k = C_k(\text{uplink}) \otimes C_k(\text{downlink}) \quad \text{Equation 24}$$

Where the vector $C_k$ may be comprised of coordinates of both $C_k$ (uplink) and $C_k$ (downlink) and each of the $C_k$ (uplink) and $C_k$ (downlink) may be computed using one of the alternatives described in the Equations 20, 21, 22, and 23.

As a part of step S620, processor 240 may cause BSC 260 to forward the determined statistical vectors of metrics (1)-(4) together with the bearer conditions and bearer identifier to ACC 270.

In step S630, processor 240 may cause ACC 270 to request from the CTM 310 the application context type label map (ACTLM) corresponding to bearer conditions of each of the bearers. The ACTLM provides a description of distinct regions of the graphs of statistical vectors that correspond to different application context types.

Figure 13B:
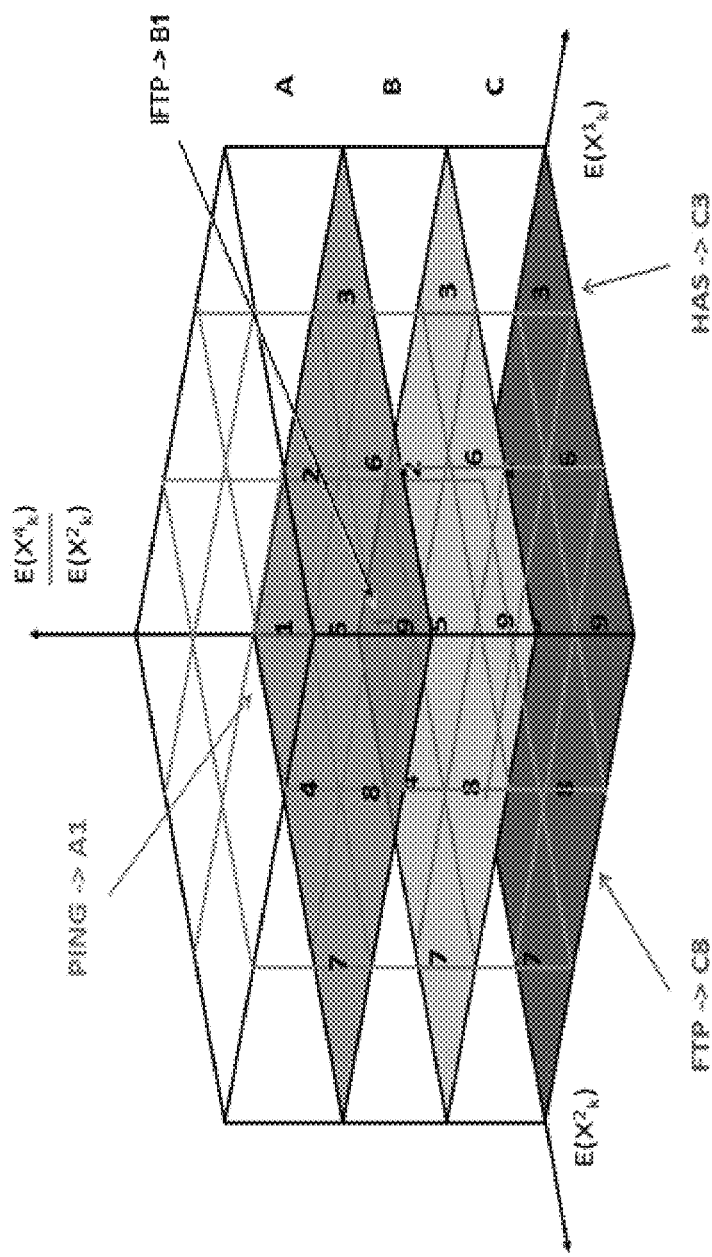
FIG. 13B depicts cluster regions for different application types, in accordance with an example embodiment.

For illustrative purpose, an example of ACTLM is given in FIG. 13B, shown as a 3-dimensional graph with statistical vectors for a single downlink bearer computed as the expected values of the metrics $X_k^i$, i=1, 2, 3, 4. In this example, the two horizontal axes show the expected values of the metrics $X_k^1$ and $X_k^3$, and the vertical axis shows a ratio of the expected values of the metrics $X_k^4$ and $X_k^2$. The axes and the number of dimensions in the ACTLM may be configured to be in accordance with the choice of the statistical vectors computed in the S620. In one example embodiment the selection of axes and number of dimensions in the ACTLM may be based upon at least one of the statistical vectors described in the equations 18-24.

Different bearer conditions may lead to differences in wireless link throughput, which in turn may yield different ACTLMs due to differences in the behavior of the metrics (1)-(4) under different wireless link throughput characteristics. For example, the ACTLM in FIG. 13B may be provided for the following bearer conditions class: congestion level 0 (no congestion), and MCS 26 to 27. The CTM 310 within the ACAF 300 may compute and maintain the ACTLMs for each class of bearer conditions, using the bearer metrics received from ACR 280 of various eNBs 105a. Further details on ACTLM computation, classes of bearer conditions, as well as the function of the components of the ACAF 300 are defined and explained with regard to the flowchart of FIG. 7, described below.

Returning to FIG. 6, in step S640 processor 240 may cause ACC 270 to identify an application context type from the statistics vectors for each uplink-downlink pair of bearers. In one example embodiment, the identification may be performed by matching the point with coordinates corresponding to the statistics vectors with the application context type regions on the ACTLM graph, where the exact match occurs if the point representing the bearer statistics vectors on the ACTLM graph may be located within a region that may be labeled with a specific application context type. If the exact match does not occur (the point representing the bearer statistics on the graph is located outside of any labeled regions), then the bearer may be classified to the application type of the closest labeled region. The labeled regions and the notion of distance between a point on the ACTLM graph and a labeled region is defined and explained with regard to the flowchart of FIG. 7, described below.

In the end of the step S640, ACC 270 may forward the data for each bearer to ACR 280. The forwarded data may include, for each bearer, the bearer identifier, the identified application context type, the computed statistics vectors, the bearer conditions, the bearer type: uplink (UL) or downlink (DL), and the bearer identifier of the matching opposite direction bearer in the UL-DL pair determined in the step S610.

In step S650, processor 240 may cause ACR 280 to forward to ACAF 300 the data received in the step S640 from ACC 270, together with the timestamp of the report and unique cell ID for the eNB 105a.

In addition, if configured so, in step S650 the ACR 280 may forward (for at least one bearer) the bearer ID together with the identified application context type to scheduler 215.

In one example embodiment, the ACR 280 may be configured to forward to the scheduler 215 only the bearer information pertaining a specific application context type (e.g. HAS application) or group of types (e.g. HAS and conversational video).

In another example embodiment, the ACR 280 may be configured to forward to the scheduler 215 only bearer application context type information for the bearers belonging to specific UEs 110.

Upon receiving the bearer application context type, the scheduler 215 may apply specific scheduling policies (that may be different for different application context types) to schedule PRB allocation for the bearers in order to improve end user quality of experience (QoE). Such scheduling policy differentiation may be especially beneficial under congestion conditions. In one example embodiment, the scheduler 215 may provide certain minimal bandwidth guarantees to best effort bearers carrying mobile video traffic even under congestion conditions, at the expense of slightly longer file download time for FTP or IFTP bearers. Such scheduling differentiation might provide significant QoE improvement for mobile video users (e.g. no video stalls, video always plays) without significant decrease in QoE for FTP or IFTP users (e.g. slightly longer file downloads which may even be imperceptible for the end users).

FIG. 7 is a method of generating application context type label maps, in accordance with an example embodiment. The discussion of FIG. 7 refers to the function of the components of ACAF 300, shown in FIG. 5. While the following steps are described as being performed by processor 340 (a dedicated processor for ACAF 300), it should be understood that the processor in eNB 105a (processor 210a), or another processor in another network node, may alternatively perform these steps.

The CTM 310 may receive and process the per bearer records of data reports that were received from ACRs 280 located in various eNBs 105a in the Radio Access Network. In the step S700, processor 340 may cause the CTM 310 to store in memory the records of previously received per bearer reports. Each record may include a timestamp when the report was received, the reported bearer identifier, the identified application context type, the computed statistics vectors, the bearer conditions, the bearer type (uplink (UL) or downlink (DL)), and the bearer identifier of the matching opposite direction bearer in the UL-DL pair. The records may contain more than one instance of reports received for the same bearer at different times.

The CTM 310 may further group together the records that belong to the same bearer conditions class. The bearer conditions may be identified by a tuple consisting of reported bearer channel conditions and reported cell congestion level (as defined above). Possible bearer conditions may be divided into a configured discrete finite set of non-overlapping bearer conditions classes. A class of bearer conditions may include bearer conditions with a certain range of reported bearer channel conditions and a certain range of reported cell congestion levels. For example a class of bearer conditions may include bearer conditions with reported average MCS value 20 and a congestion level 5. In another example a bearer conditions class may include bearer conditions with congestion levels 2 or 3 and average MCS values in the range between 18 and 20.

CL 320 may classify statistics vectors, from composite bearer reports that belong to a same class of bearer conditions, so that the statistics vectors may be grouped into "clusters" corresponding to application context types. The term "clustering" relates to graphically grouping bearer reports with similar statistics vectors (see for instance FIGS. 13A and 13B) in order to then classify the bearers into application context types, as described herein in detail. Note that the number of dimensions of the graphs, as well as the values of the axes, may be configured in accordance with the choice of the statistical vectors computed in step S620. As an example, the graphs in FIGS. 13A and 13B have 3 dimensions (3 axes), with statistical vectors for a single downlink bearer that may be computed only as expected values of the metrics $X_k^i$, i=1, 2, 3, 4. The two horizontal axes show expected values of the metrics $X_k^1$ and $X_k^3$, while the vertical axis shows a ratio of the expected values of the metrics $X_k^4$ and $X_k^2$.

In one example embodiment, the selection of the axes and number of dimensions in the graph may be based upon at least one of the statistical vectors described in the equations 18-24. Note that values of each coordinate of a configured statistical vector may exist on different scales. For clustering purposes these values may be normalized with a maximum amplitude such that the range of the values may fall into an interval, where the interval may be defined as [0,1]. In one example embodiment a well-known clustering algorithm such as fuzzy C-means (FCM) clustering may be applied to cluster the vectors ($C_k$: k=1 . . . k).

Generally, clustering algorithm optimize cluster centroids Z:=($Z_l$: l=1, . . . , L) where L denotes a number of the clusters, and the possibility that the kth composite bearer may be assigned to the lth cluster (or called membership) U={$u_{kl}$: k=1, . . . , K; l=1, . . . , L} may be determined by minimizing a sum of a distance function, as shown:

$$\min_{Z,U} \Sigma_{l=1}^L \Sigma_{k=1}^K u_{kl}^\alpha d(C_k, Z_l)$$  Equation 25

Where d(x,y) may be a distance function. In one example embodiment d(x,y) may be Euclidean distance ‖x−y‖. In another example embodiment where $C_k$ may be a joint multi-dimensional histogram, the Kullback-Leibler (KL) divergence as a distance function may be represented as $$d(x, y) := D(Z_k \| H_k) := \sum_{q=1}^{Q} z_{k,q} \log \frac{z_{k,q}}{h_{k,q}}.$$

Since statistics vectors may be clustered in high-dimensional space, the standard FCM algorithm may be used only when the dataset contains clusters that may be approximately the same shape (e.g., hyperspherical). To overcome this limitation, a more adequate method that may be implemented is the well-known kernel-based FCM method. This method allows for the separation of samples in high dimensional feature space, where such separation/classification is not feasible in low dimensional Hilbert spaces.

The CL 320 May Perform Labeling of the Application Context Type Clusters:

Clustering algorithms may identify a cluster centroid and a distinct region surrounding it in the graph for each cluster, which may serve as a label that may characterize the applications grouped in a cluster. A collection of such labels for a specific class of bearer conditions may be termed an Application Context Type Label Map (ACTLM), corresponding to the bearer conditions class.

FIG. 12 is a basic table relating application types to bearer characteristics for one class of bearer conditions, in accordance with an example embodiment. The class of bearer conditions in the FIG. 12 may be defined by bearer channel conditions reported with MCS values 26 or 27 and congestion level of 0. The table may be derived through the use of reported statistics vectors computed as the Alternative II simplified vectors (defined by Equation 21), where the choice of characteristics may be expressed as $C_k := (E(X_k^i), V(X_k^i))_{i=1}^4$. In this example embodiment, $E(X_k^i)$ may be an expected value and $V(X_k^i)$ may be a variance for each of the four metrics $X_k^i$ defined by the Equations 3 and 6 for a downlink bearer k, where the metric $X_k^2$ may be defined solely based on RLC buffer data ($\alpha_2$=1 in the equation 7), and the metric $X_k^4$ may be defined solely based on PRB utilization data ($\alpha_4$=0 in the equation 7). In particular, $E(X_k^1)$ may be the expected value (sometimes also referred to as mean value) of an averaged RLC buffer size for the downlink bearer k. $E(X_k^2)$ may be the expected value of averaged data transmission burst time interval (as computed through RLC buffer size data using equation 7 with $\alpha_2$=1 and equation 10) for the downlink bearer k, and $V(X_k^2)$ may be the variance indicating how significantly the recorded values for the durations of the transmission burst time intervals differ from the expected value. $E(X_k^3)$ may be the expected value of averaged PRB utilization for the downlink bearer k. $E(X_k^4)$ is the expected value for durations of averaged idle time intervals (as computed through PRB utilization data using equation 7 with $\alpha_4$=0 and equation 15) for the downlink bearer k, and $V(X_k^4)$ is the variance indicating how significantly the recorded values for the durations of idle time intervals differ from the expected value.

In one example embodiment, for L centroids, represented as ($Z_l$:l=1, . . . , L), statistics vectors in the reports may include an expectation and a variance computed for each metric $X_l^i$, i=1, 2, 3, 4, on a per bearer basis, where the lth group may represent behaviors of applications carried by the bearers of the group that belong to the same class of bearer conditions. The expectation and variance of each metric $X_l^i$ may be denoted as $E_l^i$ and $V_l^i$, respectively. According to a distribution of $E_l^i$ and $V_l^i$, clusters may be identified for different types of applications. For example, high $E_l^i$, i=1, 3 and high $V_l^i$, i=2, 4 indicate a high data transfer demand, while less patterns (irregularity, non-periodicity) may be found in the data request frequency, which may correspond to applications such as web browsing or intermittent file transfer protocol (IFTP).

FIG. 13A depicts an example of clustering of different bearer application context types with similar bearer conditions (being from the same class of bearer conditions), in accordance with an example embodiment. Specifically, FIG. 13A shows an example of three dimensional clusters using $$\left( E(X_k^1), E(X_k^2), \frac{E(X_k^4)}{E(X_k^2)} \right) \text{axes},$$

where the third axis shows a ratio of $E(X_k^4)$ and $E(X_k^2)$. The values of $E(X_k^1)$ and $E(X_k^1)$ may be normalized to be between 0 and 1, and the values $$\frac{E(X_k^4)}{E(X_k^2)}$$

may be normalized to be between 0 and N. The vectors $$\left(E(X_k^1), E(X_k^2), \frac{E(X_k^4)}{E(X_k^2)}\right)$$

that characterize downlink bearers and their corresponding applications fall into four distinct regions (labeled as IFTP, PING, HAS and FTP) shown within the diagram. By analyzing centroids representing the four regions, we can identify groups of applications that may be near the regions.

FIG. 13B shows cluster regions for different application types, in accordance with an example embodiment. Specifically, FIG. 13B shows cluster regions with a plane containing and $E(X_k^1)$ axis and an $E(X_k^2)$ axis that may be divided into regions denoted by indices 1 through 9, while the vertical $$\frac{E(X_k^4)}{E(X_k^2)}$$

axis may be divided into the intervals denoted by symbols A, B and C. The finite state space may be divided into twenty seven sub-blocks (or sub-regions), and a distinct application falls into one of sub-blocks. The ACTLM for a class of bearer conditions (MCS 26 or 27, and congestion level 0) is in this example embodiment a collection of the application context type cluster centroids and distinct regions surrounding them (C3 for HAS, C8 for FTP, A1 for ping, B1 for IFTP).

In viewing FIGS. 13A and 13B in conjunction with FIG. 12, it should be understood that bearers from the same bearer conditions class may be grouped ("clustered") by the statistical vectors, as described below. While the discussion of FIGS. 8-11 (described below, in conjunction with FIGS. 12 and 13) relate to an example where the bearer conditions involve an MCS 26 or 27 and a congestion level is 0, it should be understood that example embodiments may apply equally to other MCS values and other congestion levels (where these other MCS values and other congestion levels may in turn produce metric (i.e., bearer characteristic) graphs that look somewhat different from FIGS. 8-11).

HTTP Adaptive Streaming (HAS) Application:

HAS applications share general characteristics of having a high $E(X_k^1)$ (expected averaged RLC buffer size) and $E(X_k^2)$ (expected averaged PRB utilization) as the applications involve bursts of large amounts of data transfer, as indicated in FIG. 12. Additionally, HAS applications for the same class of bearer conditions involve a relatively low value of $E(X_k^2)$, as the each video segment is sent as a burst, and RLC buffer is cleared after completing the transmission of each segment of transferred data. The expected duration of a data transmission burst generally equates to an expected download time of a segment. In an example embodiment, where play duration of each HAS video segment is approximately 2 seconds, the adaptive mechanism selects a maximal video encoding rate that is close to an available bandwidth, bearer channel conditions are excellent, and congestion level is low (the data transmission bursts generally last between 1 and 2 seconds). These characteristics are reflected in FIGS. 8A and 8B, which depict regular spikes in the RLC buffer size and PRB utilization during transmission burst intervals, followed by short periods where the RLC buffer is empty and no PRBs are allocated.

HAS applications also involve a relatively low $E(X_k^4)$, as the application generally includes small (or, non-existent) idle time intervals between successive transmission bursts while the application buffer is not full, and consistent idle time intervals when the application buffer is full and the rate selection is settled on a specific optimal rate. Based on these characteristics, bearers grouped in sub-region C3 of FIG. 13B may be labeled as 'HAS Applications.'

In another example embodiment, when considering a composite bearer, the characteristics of a matching uplink bearer for a downlink HAS application may generally include a low volume of uplink traffic with notable regular idle times and regular transmission bursts corresponding to TCP acknowledgement, together with less frequent regular and uplink transmission bursts synchronized with downlink idle times corresponding to requests for a next video segment.

FTP Application:

FTP applications (as described herein) include a bulk transfer of large data objects, such as zip files or executables containing a complete application, system images, updates, large video files, progressive downloads, etc. They share general characteristics of having medium $E(X_k^1)$ and $E(X_k^3)$ values, as the applications involve a continuous transmission of a steady stream of data until the data has been transferred, as indicated in FIG. 12. Additionally, FTP applications involve very high values of $E(X_k^2)$, as the entire transfer is essentially treated as a single burst. Thus, no $E(X_k^2)$ or idle periods may be expected until the entire transfer has been completed. Moreover, it may be expected that the RLC buffer being cleared will coincide with the completion of an entire data transfer (not explicitly shown in FIGS. 10A/10B, described below). These characteristics are reflected in FIGS. 10A and 10B, which depict continuous medium levels in the RLC buffer size and PRB allocation throughput the transfer. Based on this, bearers grouped in sub-region C8 of FIG. 13B may be labeled as "FTP Applications."

In another example embodiment, when considering a composite bearer, the characteristics of a matching uplink bearer for an FTP application may generally include a low volume of traffic with notable regular idle times and regular transmission bursts (which may exhibit patterns similar to ICMP PING applications, described in details below) corresponding to TCP acknowledgements.

IFTP Application:

IFTP applications involve a bulk transfer of files, but unlike FTP applications, IFTP typically involves a transfer of many smaller disjoint files (rather than a single large file). IFTP applications may include such activities as web browsing. These applications share general characteristics of having low $E(X_k^1)$ and $E(X_k^3)$, as the applications involve a single burst for each file transferred at irregular intervals, followed by distinctly long idle periods, as indicated in FIG. 12. Additionally, IFTP applications involve low values of $E(X_k^2)$, as each file is small in size (as compared to FTP). Moreover, the collection of smaller disjoint files that typically accompanies IFTP results in uneven and unpredictable medium $E(X_k^4)$ or idle periods. While it may be expected that the RLC buffer will be cleared at the completion of each transfer (burst), that may not always hold true, due to the possible overlap of a number of these small downloads happening simultaneously. However, it is expected that once the collection of files have been transferred, the RLC buffer will be cleared (e.g. at the completion of the downloading of a web page) and that it will be followed by a significant idle period before downloading the next collection of files. These characteristics are reflected in FIGS. 8A and 8B, which depict bursts of low levels in the RLC buffer size and PRB allocation accompanied, with irregular idle periods between transfers. Based on these characteristics, bearers grouped in sub-region B1 of FIG. 13B may be labeled as "IFTP Applications."

In another example embodiment, when considering a composite bearer, the characteristics of a matching uplink bearer for an IFTP application may generally include a low volume of traffic with notable regular idle times and regular transmission bursts corresponding to TCP acknowledgements.

It should be noted that email and social networking websites may be considered a combination of FTP applications of large files and IFTP applications involving relatively smaller files.

ICMP (PING) Application:

ICMP PING involve transfers for very small amounts of data at regular intervals (similar applications include well-known network reachability tools). ICMP PING has characteristics of having zero (or near 0) $E(X_k^1)$ and $E(X_k^2)$ values, as the amount of data transmitted is small enough that data is able to be sent out without having to idle in an RLC buffer (for any significant period of time), as indicated in FIG. 12. Additionally, ICMP PING applications involve very low values of $E(X_k^3)$, as both the amount of data transmitted and the number of PRBs needed to transmit the data is very small. Moreover, the time between the transmissions (while periodic) is large, thus resulting in high $E(X_k^4)$ or idle periods, due to the small amount of data transfer where the RLC buffer is typically always cleared. These characteristics are reflected in FIGS. 9A and 9B, which depict an average RLC buffer size at zero and PRB allocation accompanied with irregular idle periods between transfers. Based on these characteristics, bearers grouped in sub-region A1 of FIG. 13B may be labeled as "ICMP Applications."

In another example embodiment, when considering a composite bearer, the characteristics of a matching uplink bearer for an ICMP PING application may generally include similar patterns of traffic which in this case may involve responding to a source with a copy of the data that has been received.

Based on the examples above, in another example embodiment, a finer and more robust classification for composite bearers may be achieved if a complete vector $C_k$ may be considered in a high dimensional space. Based on the discussion of the application above, it should be understood that the above example can be easily generalized to the other types of applications.

Returning to FIG. 7, in step S700 processor 340 may cause CTM 310 to store in memory and maintain previously computed cluster data, and store ACTLM information, for each class of bearer conditions. In one example embodiment, initially the cluster data and ACTLMs may be configured in CTM 310 memory using the data assembled from various past data record collections and wireless network simulations. In another example embodiment, the CTM 310 may build the initial stored cluster data and ACTLMs by processing the received reports, as detailed below.

In Step S710, processor 340 may cause CTM 310 to receive a per bearer report from ACR 280 that may include (for each bearer) the bearer identifier, the identified application context type, the computed statistics vectors, the bearer conditions, the bearer type (uplink (UL) or downlink (DL)), and the bearer identifier of a matching opposite direction bearer in the UL-DL pair of bearers carrying traffic of the same application, together with the timestamp of the report, and a unique cell ID for the eNB 105a.

The CTM 310 may forward the bearer identifier, the application context type, the timestamp of the report, and the unique cell ID for the eNB 105a to ACD 330, for further distribution to various entities within the IP-CAN 100a and network 10a. If the bearer is a composite bearer, and the bearer statistics vectors include statistics computed for both UL and DL components of the composite bearer, information sent by CTM 310 to ACD 330 may then include both UL and DL bearer components. The CTM 310 then may proceed with the following steps that may allow updating and improving the previously stored ACTLM.

In step S720, processor 340 may cause CTM 310 to identify the class of bearer conditions that may include a set of bearer conditions matching the reported bearer conditions. The CTM 310 then may select the existing records, cluster data and ACTLM for the identified class of bearer conditions, and passes this information to CL 320. The CTM 310 also may store the new report data together with the previously received report data for the identified class of bearer conditions.

In step S730, processor 340 may cause CL 320 to add the new reported bearer statistics vectors to the previously computed cluster data for the identified class of bearer conditions.

In step S740, processor 340 may cause CL 320 to check if the addition of new data causes a need for cluster adjustment, which may involve re-computing coordinates of a centroid of at least one of the clusters, or generating a new label map due to changed boundaries of at least one cluster region. In one example embodiment, re-computing coordinates of a cluster centroid and relabeling may be required if a new bearer is classified according to the cluster label, and graphing bearer statistics vector places the bearer outside of the cluster region. In another example embodiment, re-computation of a cluster centroid, without a need for generating a new label, may be required if the new bearer vector statistics is graphed inside of a cluster label, but the center of gravity for the cluster has moved as a result of adding the newly reported statistics vector.

If in step S740, it may be determined that the cluster adjustment is needed, then in step S750 processor 340 may cause CL 320 to adjust cluster centroids and the cluster boundaries that may be recomputed using the configured well-known clustering techniques, and a new ACTLM may be generated. This step may conclude the learning process.

In step S760, processor 340 may cause ACD 330 to send a cell ID with bearer identifier and the identified bearer application context type to elements of the network 10a. In one example embodiment, ACAF 300 may provide application awareness feedback to elements of the network 10a to control an operation of an application.

In one example embodiment, processor 340 may control an operation of an application by causing ACAF 300 yo provide feedback to the eNB scheduler 215 to adjust scheduler algorithms for application context type. After receiving the feedback on an application context type of the bearers, the scheduler 215 may implement a bearer context type aware resource allocation. This allocation may provide different scheduling policies (with differing amounts of resource allocation) to be applied to a best efforts (BE) bearer depending upon the application context that the bearer carries. Such context based differentiation may enable smooth operation of mobile applications running at typical Best Effort QCI priority, with higher rates, greater stable, and without freezing or other negative impacts in mobile video quality. These adjustments also provide a better response time for web browsing and social networking applications, while maintaining satisfactory performance of more delay tolerant applications such as FTP. In addition, such scheduling policy differentiation may be especially beneficial under congestion conditions when there is a shortage of resources.

In one example, under congestion conditions, the scheduler 215 may control an operation of an application by implementing policy differentiation among Best Effort (BE) bearers by prioritizing PRB resource allocation to bearers carrying application types that may be more sensitive to delay and jitter, such as mobile video traffic. In this example, scheduler 215 may assign priorities in the order of from a highest to a lowest priority, as follows: a first priority order may be bearers carrying live conversational video and live broadcast video (where little or no buffering of video data may be performed at the video clients, and delay may cause video freezes and potential session closings by end users) as well as low volume bearers such as carrying ICMP PING or TCP acknowledgements; a second priority order may be bearers carrying HTTP adaptive streaming video or progressive video (where there is buffering performed at the clients, but excessive delays may cause client video buffer depletion resulting in video freezes); a third priority order may be bearers carrying intermittent FTP such as web browsing or social networking (where certain delays may be tolerated by the end users, but excessive delays in web page loading or social networking updates may lead to the end users abandoning application service); a fourth priority order may be bearers carrying FTP (where the end users may be typically more tolerant to somewhat longer download times). The weighted fair scheduler 215 may exercise such prioritization by assigning higher weights to bearers carrying mobile video application traffic. To avoid starvation of the above lower priority applications, the scheduler may implement certain minimum bandwidth guarantees for lower priority applications, allowing these applications to avoid significant performance degradation.

In another example, the context aware scheduler 215 may use a resource allocation schema that fulfills certain minimum bandwidth, delay and jitter requirements for the bearers that are derived from a known application context type.

In another example, the scheduler 215 may control an operation of an application by treating Guaranteed Bit Rate (GBR) bearers carrying FTP or intermittent FTP applications as Best Effort bearers, while continuing to prioritize GBR bearers carrying mobile video application types. Such differential treatment may allow the network to continue providing GBR service for premium users (that are getting GBR service based upon their IMSI identity according to their service level agreements) while GBR users watch mobile video, while allowing other users to utilize the network resources when GBR users are not using GBR services.

In another example embodiment, ACAF 300 may provide feedback to PGW 103 or PCRF 106 for additional application context driven flow control (where PGW 103 and PCRF 106 may be referred to as "management entity" nodes). In this example, upon receiving notification that specific BE bearer may be carrying application context type that is known to be delay or minimum throughput sensitive (such as mobile video), PCRF 106 may perform an elevation in priority of such a BE bearer to a higher non-GBR QCI priority (or even to a GBR QCI priority) Such an elevation in priority may be performed via standard 3GPP defined bearer modification procedures with the delay settings controlled by packet delay budget associated with the selected QCI, and throughput controlled by a minimal bit rate for the GBR configuration.

It should be understood that while example embodiments place the ACIF 240 functional components within eNB 105a, in a virtual RAN or software defined networks architecture, where functional components of the eNB 105a may be distributed and dynamically instantiated within a cloud of general purpose computing nodes, the ACIF 240 and ACAF 300 functional components may be likewise distributed and dynamically instantiated within a cloud of general purpose computing nodes.

It should be understood that while the example embodiments refer to a LTE network, these embodiments could also be applied to other wireless access networks where wireless resources used to transmit data traffic may be allocated by a corresponding wireless access technology scheduler and stored in buffers prior to being transmitted over the air. Examples of such technologies include but not limited to 3GPP WCDMA, UMTS, 3GPP2 EVDO, WiMAX.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of controlling an operation of an application in a communication network by classifying an application type, comprising:
    obtaining, by one or more processors of at least one network node, bearer metrics for one or more bearers in the communication network;
    computing, by the one or more processors, statistics vectors for the bearer metrics;
    classifying, by the one or more processors, the application type by locating points on a label map corresponding to the statistics vectors to obtain application type information that is associated with the one or more bearers; and
    exporting, by the one or more processors, the application type information to a node processor of a network node to control an operation of an application by adjusting a scheduling of data communications for the one or more bearers.

2. The method of claim 1, wherein the exporting includes exporting the application type information to at least one of a node processor running an application function, a node processor of an e-Node B, and a node processor of a user equipment, and a node processor of a management entity node in order to control the operation of the application.

3. The method of claim 1, wherein the obtaining includes obtaining per bearer metrics that are at least one of a radio link control (RLC) buffer size, a physical resource block (PRB) utilization, a transmission burst interval and an idle time interval.

4. The method of claim 3, wherein the obtaining further includes obtaining bearer condition information and bearer identifier information, the bearer condition information including at least one of bearer channel condition information and cell congestion level information.

5. The method of claim 1, wherein the computing further includes,
    identifying pairs of bearers associated with the obtained bearer metrics, wherein each pair of bearers belongs to a same application and includes a first bearer carrying uplink transmissions and a second bearer carrying downlink transmissions,
    computing the statistics vectors for bearer metrics for each of the identified pairs of bearers.

6. The method of claim 1, further comprising:
    obtaining the label map by,
        obtaining bearer reports on previously classified bearers,
        calculating cluster centroids and defined cluster regions for at least one particular application type,
        the label map including the calculated cluster centroids and defined cluster regions for the at least one particular application type.

7. The method of claim 6, wherein the bearer reports include previously determined bearer information on a per-bearer basis for the previously classified bearers including at least one of bearer identifiers, previously identified application types, previously computed statistics vectors, previously determined bearer conditions, and previously determined information on pairings of the bearers.

8. The method of claim 6, wherein the classifying further includes,
    locating points on or near the defined cluster regions of the label map that correspond to the statistics vectors, wherein the defined cluster region associated with the at least one particular application type that is closest to each located point is determined to be the classified application type.

9. The method of claim 8, wherein the steps associated with the obtaining of the label map is repeated as application types for additional bearers are classified into one of the particular application types.

10. A network node in a communication network, comprising:
    one or more processors configured to,
        obtain bearer metrics for one or more bearers in the communication network,
        compute statistics vectors for the bearer metrics,
        classify the application type by locating points on a label map corresponding to the statistics vectors to obtain application type information that is associated with the one or more bearers, and
        export the application type information to a processor network node to control an operation of an application by adjusting a scheduling of data communications for the one or more bearers.

11. The network node of claim 10, wherein the one or more processors is further configured to export the application type information by exporting the application type information to at least one of a node processor running an application function, a node processor of an e-Node B, and node processor of a user equipment, and a node processor of a management entity node in order to control the operation of the application.

12. The network node of claim 10, wherein the one or more processors is further configured to obtain the bearer metrics by obtaining per bearer metrics that are at least one of a radio link control (RLC) buffer size, a physical resource block (PRB) utilization, a transmission burst interval and an idle time interval.

13. The network node of claim 12, wherein the one or more processors is further configured to obtain the bearer metrics by obtaining bearer condition information and bearer identifier information, the bearer condition information including at least one of bearer channel condition information and cell congestion level information.

14. The network node of claim 10, wherein the one or more processors is further configured to compute statistics vectors by,
    identifying pairs of bearers associated with the obtained bearer metrics, wherein each pair of bearers belongs to a same application and includes a first bearer carrying uplink transmissions and a second bearer carrying downlink transmissions,
    computing the statistics vectors for bearer metrics for each of the identified pairs of bearers.

15. The network node of claim 10, wherein the one or more processors is further configured to,
    obtain the label map by,
        obtaining bearer reports on previously classified bearers,
        calculating cluster centroids and defined cluster regions for at least one particular application type,
        the label map including the calculated cluster centroids and defined cluster regions for the at least one particular application type.

16. The network node of claim 15, wherein the bearer reports include previously determined bearer information on a per-bearer basis for the previously classified bearers including at least one of bearer identifiers, previously identified application types, previously computed statistics vectors, previously determined bearer conditions, and previously determined information on pairings of the bearers.

17. The network node of claim 15, wherein the one or more processors is further configured to classify the application type by,
    locating points on or near the defined cluster regions of the label map that correspond to the statistics vectors, wherein the defined cluster region associated with the at least one particular application type that is closest to each located point is determined to be the classified application type.

18. The network node of claim 17, wherein the one or more processors is further configured to repeat the steps associated with the obtaining of the label map as application types for additional bearers are classified into one of the particular application types.

\* \* \* \* \*